United States Patent [19]
Shapiro et al.

[11] Patent Number: 5,225,875
[45] Date of Patent: Jul. 6, 1993

[54] HIGH SPEED COLOR DISPLAY SYSTEM AND METHOD OF USING SAME

[75] Inventors: Leonid Shapiro, Lakeside; Randall S. Farwell, San Diego; Robert Shaw, Escondido, all of Calif.

[73] Assignee: Proxima Corporation, San Diego, Calif.

[21] Appl. No.: 586,506

[22] Filed: Sep. 21, 1990

Related U.S. Application Data

[63] Continuation-in-part of Ser. No. 546,238, Jun. 29, 1990, abandoned, which is a continuation-in-part of Ser. No. 506,429, Apr. 9, 1990, abandoned, which is a continuation-in-part of Ser. No. 506,621, Apr. 9, 1990, abandoned, each is a continuation-in-part of Ser. No. 472,668, Jan. 30, 1990, abandoned, and a continuation-in-part of Ser. No. 222,144, Jul. 21, 1988, abandoned.

[51] Int. Cl.$^5$ ............................................. G09G 5/04
[52] U.S. Cl. ................................. 340/703; 358/21 R
[58] Field of Search .............. 340/701, 703, 717, 720, 340/784, 793, 805, 811, 813, 814; 358/11, 21 R, 60, 61, 141, 160, 230, 231, 236, 240, 455; 359/54, 58, 59; 395/100, 118

[56] References Cited

U.S. PATENT DOCUMENTS

| | | | |
|---|---|---|---|
| 4,531,160 | 7/1985 | Ehn | 340/793 |
| 4,536,856 | 8/1985 | Hiroishi | 395/100 |
| 4,631,692 | 12/1986 | Broedner | 340/701 |
| 4,760,387 | 7/1988 | Ishii et al. | 340/717 |
| 4,779,083 | 10/1988 | Ishii et al. | 340/784 |
| 4,827,255 | 5/1989 | Ishii | 340/793 |
| 4,838,654 | 6/1989 | Hamaguchi et al. | 340/784 |
| 4,855,728 | 8/1989 | Mano et al. | 340/805 |
| 4,864,390 | 9/1989 | McKechnie et al. | 340/784 |
| 4,886,343 | 12/1989 | Johnson | 340/784 |
| 4,906,071 | 3/1990 | Takahara et al. | 353/20 |
| 4,913,674 | 4/1990 | Nicholas | 445/24 |
| 4,922,240 | 5/1990 | Duwaer | 340/784 |
| 4,931,787 | 6/1990 | Shannon | 340/784 |
| 4,936,656 | 6/1990 | Yamashita et al. | 340/784 |
| 5,062,001 | 10/1991 | Farwell et al. | 340/793 |

Primary Examiner—Richard Hjerpe
Attorney, Agent, or Firm—Bernard L. Kleinke; Jerry R. Potts

[57] ABSTRACT

A high speed color display system including a modulation circuit electrically coupled between a high speed display device, such as an active matrix liquid crystal display panel, and a video output signal source, such as a video output card of a personal computer. The modulation circuit including both a scaling circuit for eliminating or substantially reducing contouring caused by quantizing errors associated with approximations of digital pictures and a duty cycle scaling circuit for eliminating or substantially reducing repetitive beats in a displayed image.

6 Claims, 15 Drawing Sheets

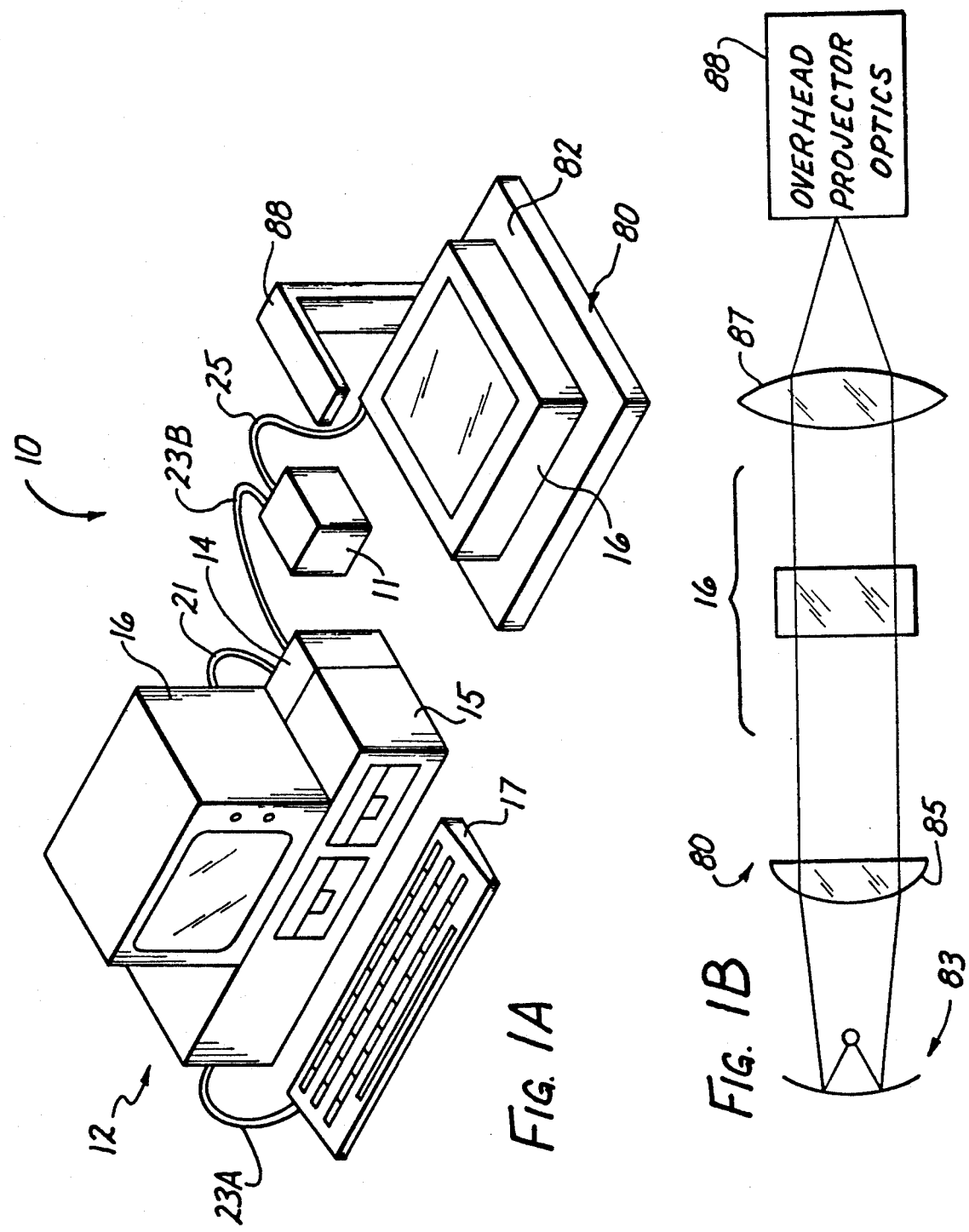

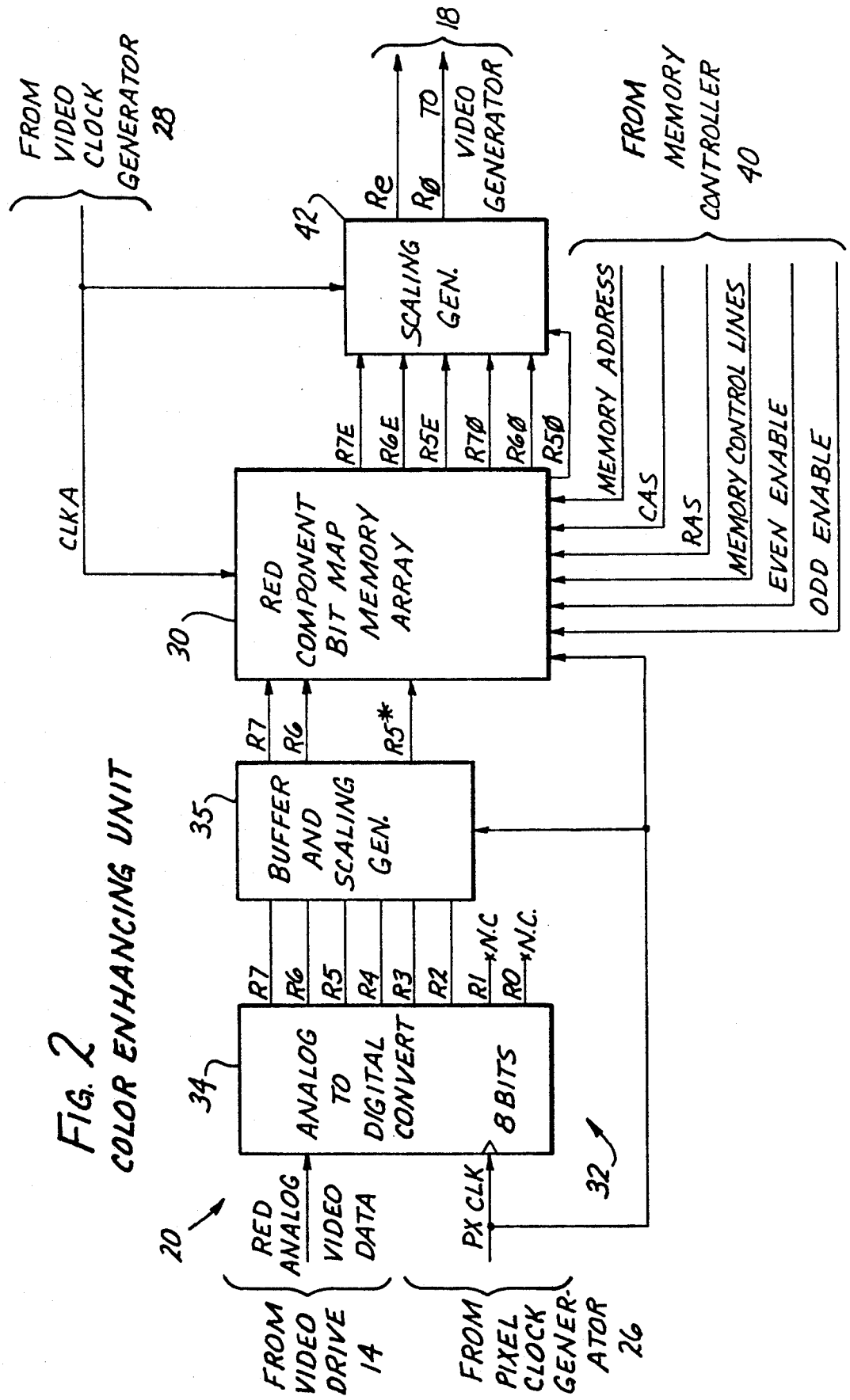

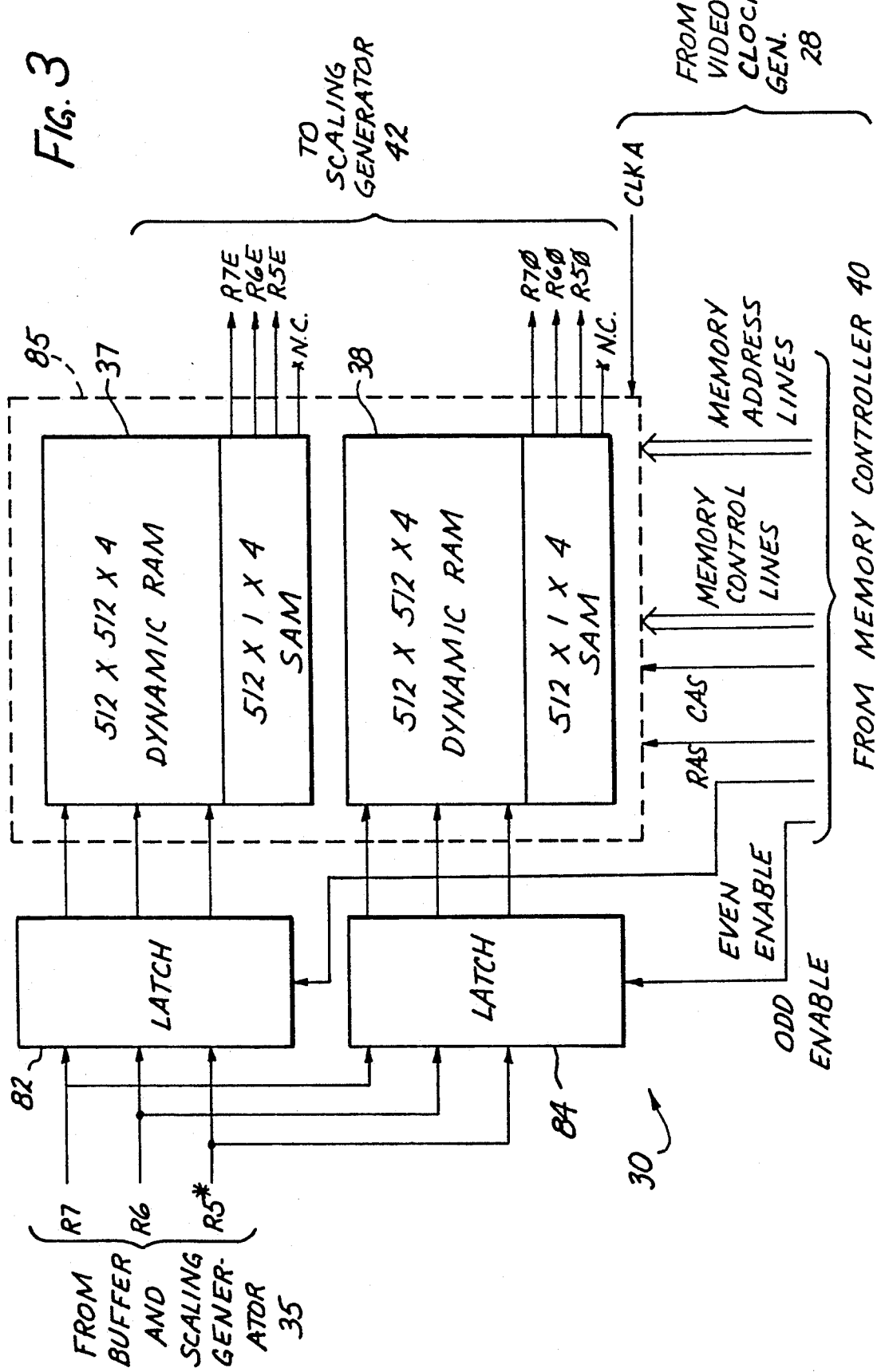

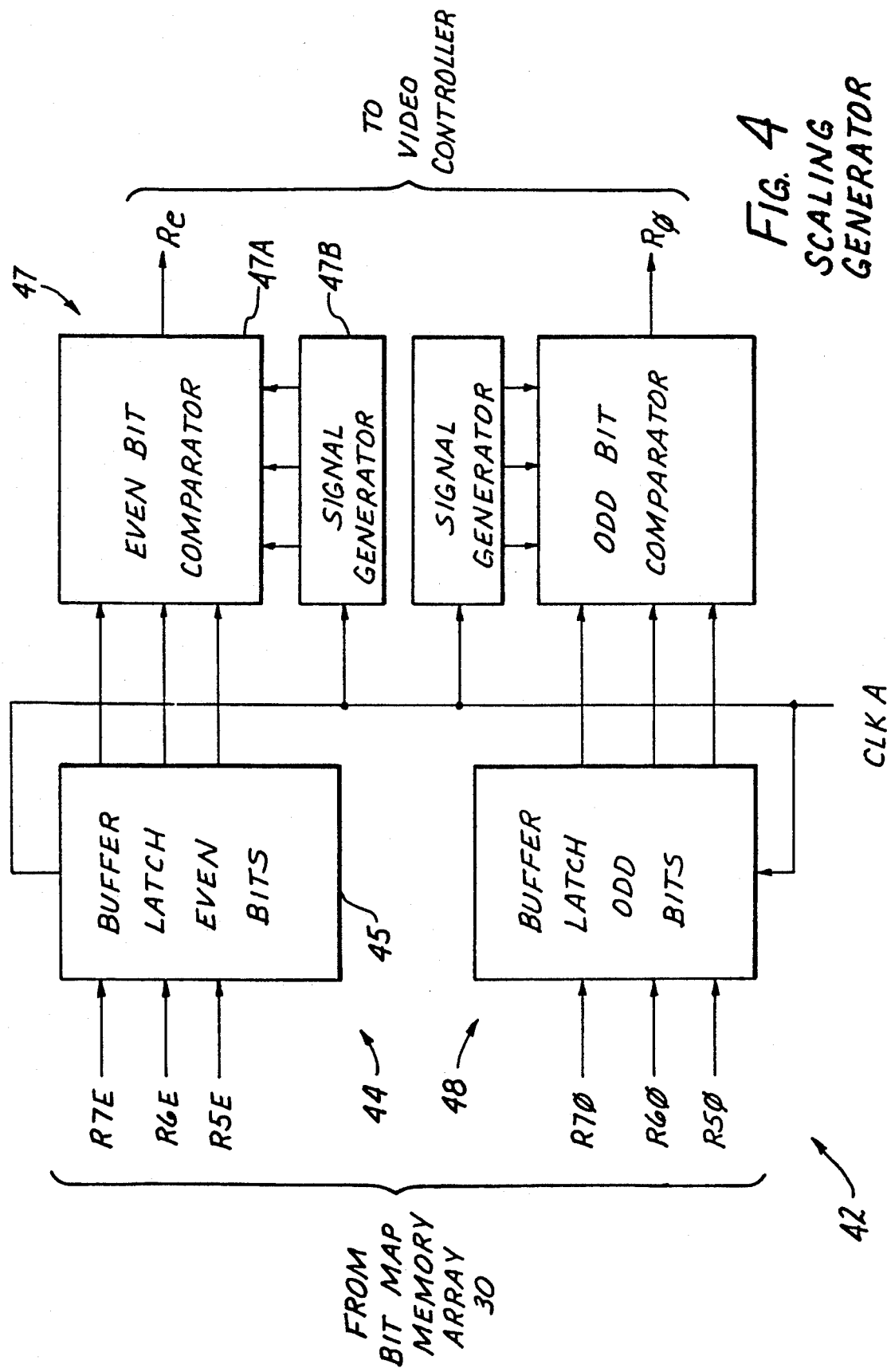
FIG. 4 SCALING GENERATOR

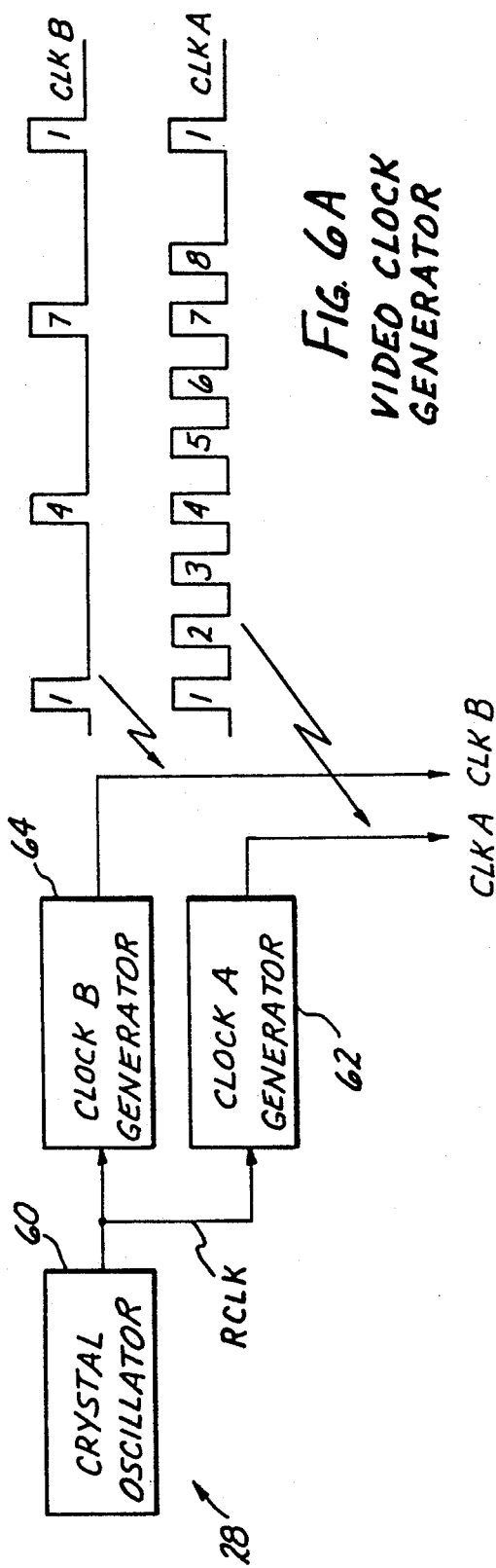
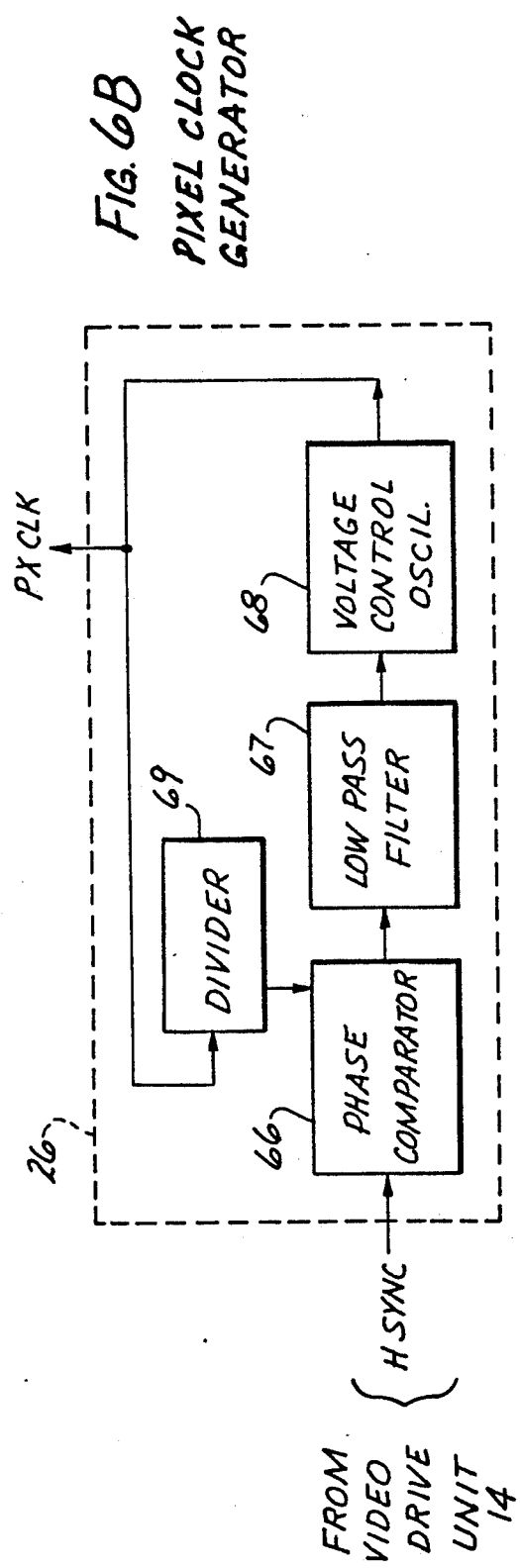

HIGH SPEED COLOR DISPLAY SYSTEM AND METHOD OF USING SAME

CROSS-REFERENCE TO RELATED APPLICATIONS

The present invention is a continuation-in-part of U.S. patent application Ser. No. 07/546,238 filed Jun. 29, 1990, entitled "STACKED DISPLAY PANEL CONSTRUCTION AND METHOD OF MAKING SAME," now abandoned, which is a continuation-in-part of U.S. patent application Ser. No. 07/506,429 filed Apr. 9, 1990, entitled "STACKED DISPLAY PANEL CONSTRUCTION AND METHOD OF MAKING SAME," now abandoned, which is a continuation-in-part of U.S. patent application Ser. No. 07/506,621 filed Apr. 9, 1990, entitled "STACKED DISPLAY PANEL CONSTRUCTION AND METHOD OF MAKING SAME," now abandoned, which are continuation-in-parts of U.S. patent application Ser. No. 07/472,668 filed Jan. 30, 1990, entitled "LIQUID CRYSTAL DISPLAY PANEL SYSTEM AND METHOD OF USING SAME," now abandoned, and of U.S. patent application Ser. No. 07/222,144 filed Jul. 21, 1988, entitled "GRAY SCALE SYSTEM FOR VISUAL DISPLAYS," now abandoned in favor of a continuation patent application Ser. No. 07/507,630 filed Apr. 11, 1990, entitled "GRAY SCALE SYSTEM FOR VISUAL DISPLAY" now U.S. Pat. No. 5,062,001. The foregoing patent applications are incorporated herein by reference.

TECHNICAL FIELD

The present invention relates in general to a full-color display system, and a method of using it. The invention more particularly relates to a method and apparatus for producing a full-color display system, which may include a high speed display panel, such as a liquid crystal active matrix panel.

BACKGROUND ART

There have been various different types and kinds of full-color display systems, such as for use with computer-driven projection display panels, computer monitor screens, and television screens. Inventive techniques for producing such a full-color display, are disclosed in the foregoing-mentioned parent patent applications. The techniques include the use of twisted nematic liquid crystal display panels, which are stacked or arranged in series along a common optical path. Each one of the panels, together with a set of interleaved polarizers, pass three different primary colors, such as red, blue and green. The three primary colors are selectively and additively combined to provide a group of full colors. In this regard, by selectively either energizing or deenergizing certain ones of the panels, combinations of colors can be achieved from the output stage of the display system.

According to the inventive techniques employed in the foregoing mentioned pending patent applications, each one of the three stages of the stacked panel system, can produce multiple numbers of shades of each one of the three primary colors. The patentable techniques, thus, enable a large number of combinations of colors to be passed by the display system.

The twisted nematic liquid crystal display panels, while being quite effective, are limited in their speed of operation. Thus, the more modern high-speed active matrix display panels have been developed. Such an active matrix panel is a single panel employing three different color elements for each pixel. Therefore, there is no need to have three separate panels to provide a multi-color display. The active matrix panel, employs pixel elements each having three color subpixel components, and operates at a much higher speed than its earlier twisted, nematic panel.

By employing three color components for each pixel, a color additive process, of selecting individual ones of the three colors, permits a total of eight colors, which may be passed for each pixel. However, in order to increase the number of colors from the pixel, various different shades or intensity levels for each color component is required. One approach to achieve such intensity levels would be to provide additional hardware circuits for driving the pixel elements through various different color intensity levels for each one of the three color components in a pixel element. While this approach may be satisfactory for some applications, such an approach would be quite expensive to manufacture.

In the foregoing mentioned patent applications, intensity levels have been produced by employing a duty-cycle modulation system. In this regard, each one of the three color element is either turned on or off, each raster display frame. However, when a color element is to be energized to produce a desired shade of a color, it will remain on for a certain average percentage of the time over a series of raster frames. The persistence of the eye of the viewer perceives a resulting color to be of a certain desired intensity or shade. In this approach, electronic control circuits are provided to cause the individual color pixel elements to be turned ON selectively, and OFF selectively, to achieve a desired color intensity level.

When employing such an electronically controlled modulation or duty cycle system in a high-speed display system, such as an active matrix display system, the difference of speed between the computer controlled modulation circuit, and the much higher speed display panel, causes an undesirable movement of the image. Such a movement of the image is undesirable and unwanted for certain applications.

In order to match the speed of the computer controlled circuit, as governed by the maximum speed of the computer driving it, to the much higher speed display panel, the use of memories, such as a bit map memory for storing an image to be displayed, can provide the necessary matching of the speeds. However, this technique is not entirely desirable for some applications, since there is a quantizing error introduced by employing such an approach. The resulting image is a digitized image, which is an approximation only of the desired analog signal. For more information relating to the problems of quantizing error, reference may be made to a book entitled "Digital Pictures Representation and Compression" by Arun N. Netravali and Barry G. Haskell.

The quantizing error causes an undesirable "contouring" or splotchiness of the resulting color images. In other words, when the number of shades or intensities of a given color is increased, due to the quantization of the picture image, the resulting color image is merely an approximation of a corresponding analog signal image of the color to be displayed, and the resulting image produced, is not entirely satisfactory.

In order to reduce the quantizing error to such a level that the contouring or splotchiness is reduced to an acceptable level, at least eight or nine bits of color information are required for a given color intensity. However, such a bit map memory required for a high speed display, would be excessively large in size, and unduly expensive, in order to match the speeds of the computer with the high-speed display. Additionally, should the modulation or duty cycle technique be employed to increase the number of possible color intensity levels, the duty cycle control circuits would be excessively complex, and thus be too expensive to manufacture for some applications.

Therefore, it would be highly desirable to produce a very large number of full colors from a high-speed display, without causing an undesirable movement of the resulting image caused by improper matching of speeds between the computer and the display, and also without contouring or splotchiness caused by excessive quantizing error associated with approximations of digital pictures.

DISCLOSURE OF INVENTION

Therefore, the principal object of the present invention is to employ a new and improved multiple color display systems employing high-speed display panels, for reduced or eliminated quantizing error, to produce a very large number of colors from the display.

Briefly, the above and further objects of the present invention are realized by providing a controller employing a modulation or duty cycle circuit coupled between the high-speed display and a memory, which is driven by a computer. In order to increase greatly the number of color intensity levels, additional modulation or duty cycle circuits may be employed between the computer and the bit map memory.

Such a technique enables a concentration of a large number of signals encoding digitally a desired one of a large number of color intensity levels, down to a much smaller number of such signals for storage in the memory. By employing the modulation circuit between the memory and the display, a high-speed concentration flow of information is achieved, thereby reducing the quantizing error, and desired high operating speed of the display.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 1A is a pictorial, partially diagrammatic view of a high speed color display system, which is constructed in accordance with the present invention, and which is illustrated being employed in a computer driven, overhead projection arrangement;

FIG. 1B is a diagrammatic view of the system and the arrangement of FIG. 1A.

FIG. 2 is a functional block diagram of one of the color enhancing units of the high speed color enhancing interface controller of FIG. 1C;

FIG. 3 is a functional block diagram of a bit map memory array of the unit of FIG. 2;

FIG. 4 is a functional block diagram of a scaling generator of the unit of FIG. 2;

FIG. 6A is a functional block diagram of a video clock generator of the system of FIG. 1A;

FIG. 6B is a functional block diagram of a pixel clock generator of the system of FIG. 1A;

BEST MODE FOR CARRYING OUT THE INVENTION

Figure 1C:
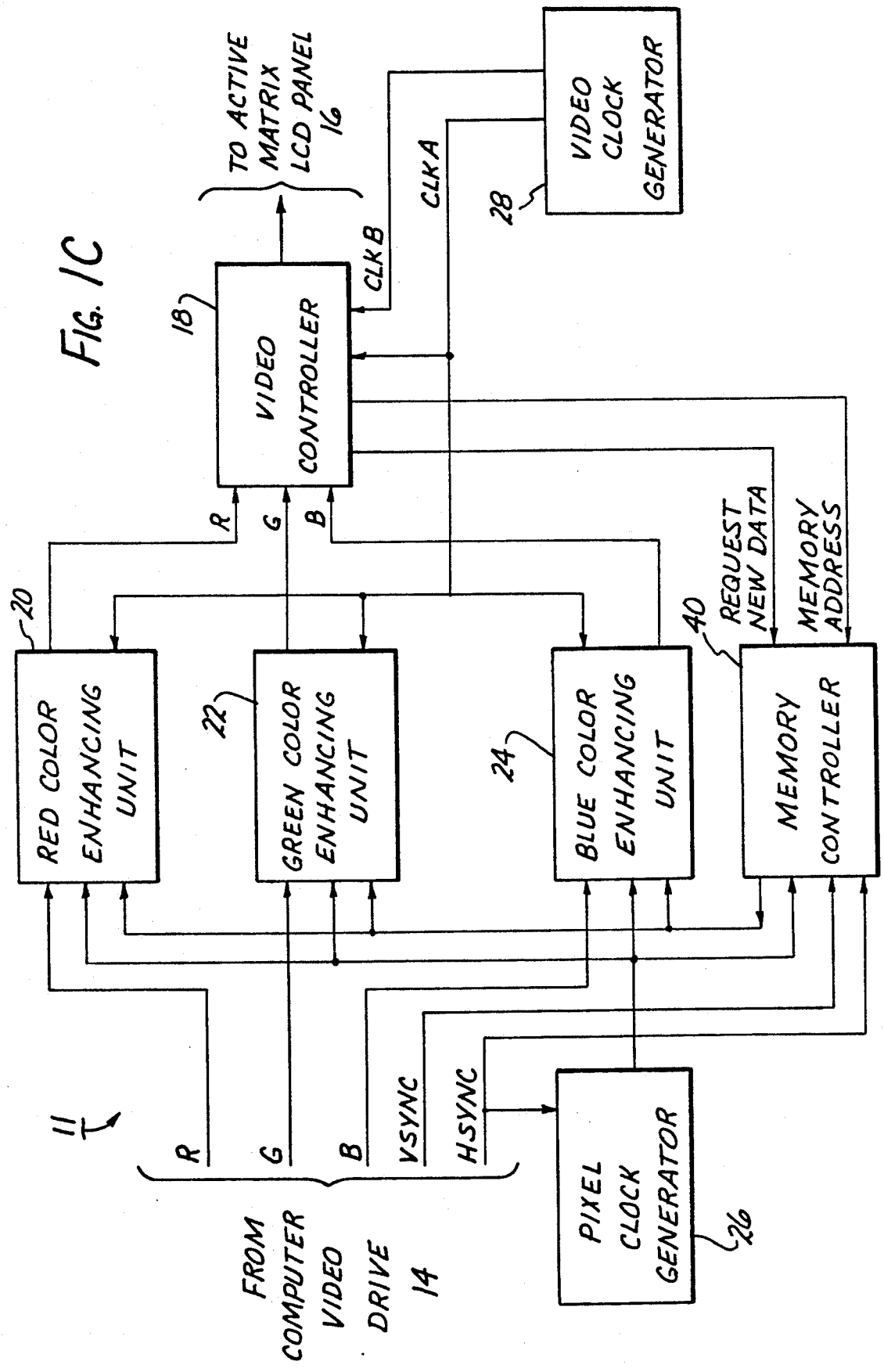
FIG. 1C is a block diagram of a high speed color enhancing interface controller of FIG. 1A.

Referring to the drawings, and more particularly to FIG. 1A, there is illustrated a high speed color display system 10, which is constructed in accordance with the present invention, and which is adapted for use as a video color display system capable of displaying a very large number of, different color shadings. Thus, the system 10 is a high speed video color display system, and is employed in a computer-driven overhead projection arrangement, a direct view system or any similar type of color display system, such as a high speed color monitor, or a direct view display panel.

As shown in FIG. 1A, the system 10 is adapted for use in an arrangement employing a conventional personal computer 12 having a video drive module 14, and an overhead projector system 80. The system 10 generally comprises a high speed color enhancing interface controller 11 for translating conventional computer video output signals from the video drive module 14 into high speed video signals capable of producing a large number, such as hundreds of thousands of different color shadings and hues, for display by a high speed display device, such as a thin film transistor active matrix liquid crystal display panel 16 for displaying color images produced from the high speed video signals.

The video drive module 14 supplies a convention RGB analog video signal including horizontal and vertical synchronizing signals to the color enhancing interface controller 11. The controller 11 not only provides the necessary control functions to interface the personal computer 12 to the high speed display device 16, but also quantizes the conventional RGB analog signal so that a minimum of approximately 256,000 ($2^6+^6+^6$) colors can be displayed by the active matrix panel 16.

The personal computer 12 may be an Apple MAC II personal computer which includes a computer processing unit 15 to which data and commands may be entered via a keyboard unit 17. The high speed display device 16 in cooperation with the overhead projector system 80 enables large audience viewing of the computer generated information.

Considering now the overhead projection device 80 in greater detail with reference to FIGS. 1A and 1B, the projection device 80 generally includes a flat transparent projection surface 82 which is adapted to support the active matrix panel 16 for projecting purposes. The overhead projection device 80 includes an illumination bulb and reflector shown generally at 83 (FIG. 1B) for transmitting light through the panel 16.

In order to collimate the light produced by the bulb and reflector 83 into the panel 16, the device 80 also includes a collimating Fresnel lens 85 disposed below the transparent surface 82. The active matrix panel 16 also includes a focusing lens 87, preferably a Fresnel lens for converging the light exiting the panel 16 onto an overhead projection optics assembly 88. In this regard, the projection assembly 88 enables light passing through the panel 16 to be focused onto a projection screen or other suitable surface (not shown), for audience display purposes.

While in the preferred form of the present invention, the lens 87 is disposed on the panel 16, it will be understood by those skilled in the art that the focusing lens may also be disposed in a projection assembly, such as assembly 88. In this regard, the high speed color system 10 and method of using it, enables the number of colors displayed by the active matrix panel 16 to be greatly expanded from a conventional eight color system based on an RGB video signal to an extremely large number of colors, approaching $2^{18}$ simultaneous colors.

It will be understood by those skilled in the art that, although the preferred form of the present invention includes an Apple II computer generated RGB analog video drive source, other conventional computer video drive systems, such as the IBM Enhanced Graphic Adapter ("EGA"), a CGA system, a VGA system or an RGB digital system, may be employed, in accordance with the present invention.

The active-matrix thin-film transistor liquid crystal display panel 16 includes a pixel matrix array for generating a selected number of image elements in a primary color arrangement (red, green, blue) for forming the computer generated color image.

Each pixel location or element in the pixel matrix array, includes a set of three subpixel components, one for each of the corresponding primary colors of red, green and blue respectively. In this regard, the active matrix panel 16 is capable of producing a full color image having at least 250,000 different color shading and hues. The active matrix panel 16 is conventional and manufactured by such suppliers as Hitachi, Sharp, Toshiba and Seiko Instruments.

While the preferred form of the present invention is designed to be used with an active matrix panel in a color additive configuration, it will become apparent to those skilled in the art that the present invention may be employed in a color subtractive configuration. In this regard, each pixel element in the subtractive configuration is normally fully actuated and then modulated off and on to produce the desired levels of shading. In such a color subtractive system, a complementary color arrangement (magenta, yellow, cyan) would be employed.

Considering now the high speed color enhancing interface controller 11 in greater detail with reference to FIG. 1C, the controller 11 generally includes a video controller 18 for interfacing the personal computer video drive module 14 to the active matrix panel 16 and, a set of three color enhancing units 20, 22 and 24 for quantizing the RGB analog video drive signals from the computer video drive module 14 into a set of digital signals for producing up to approximately 256,000 different color shadings and hues. In accordance with the present invention, the video controller 18 causes each of the pixels in the active matrix panel 16 to be switched rapidly on and off to generate a color image by a color additive blending process, without causing patterning or flicker in this displayed image.

The high speed panel 16 operates at a much higher speed than the personal computer 12. Therefore, the controller 11 serves as an interface between the slower computer, and the faster display 16. As mentioned, previously, the controller 11 also serves the function of increasing greatly the number of different levels of color shadings and hues, without substantial patterning or flicker distortions of the resulting image displayed by the panel 16.

In order to translate or convert the slower conventional RGB analog signals into quantized digital signals acceptable for driving the active matrix panel 16, the controller 11 includes a memory controller 40 for permitting the quantized digital signals to be stored and retrieved from the enhancing unit 20, 22 and 24. In this regard, the controller 11 also includes a pair of clock generators, a slower pixel clock generator 26 for helping to facilitate the storing of video digital data in the units 20, 22 and 24 at a slow rate and a video clock generator 28 for enabling the stored quantized data to be retrieved at a substantially higher rate. In this regard, the enhancing units 20, 22 and 24 permit the refresh rate of the RGB video data from the personal computer 12 to be accelerated by converting the RGB analog signals into a set of quantized digital signals, storing the converted signals at a slow rate, and subsequently permitting the retrieval of the quantized data therefrom at a much faster rate for utilization by the display 16.

In operation, the personal computer 12 via its video drive module 14 generates conventional RGB video signals indicative of computer generated colored images composed of a large number of pixel elements. The RGB video analog signal is indicative of three individual primary color components (red, green, blue) for each pixel element, including the respective brightness of each component for reproducing a color image. The computer generated signals also include corresponding control signals, namely, horizontal sync (HSYNC) and vertical sync (VSYNC) indicative of a pixel matrix address for selecting the individual pixel elements to reproduce the desired color image. For the purpose of simplifying the block diagrams of FIG. 1C, memory addressing writing line, memory addressing reading lines, and memory control lines are multiple leads, but they have been shown as a single lines from the memory controller 40 to each of the color enhancing units 20, 22 and 24.

The control signal HSYNC produced by the video drive module 14 is coupled to the pixel clock generator 26 in order to generate the pixel clock signal (PXCLK) for controlling the storage of the RGB video data into the bit map memory arrays, such as a memory array 30 of the color enhancing unit 20, as shown in FIG. 2. The pixel clock generator 26 is a conventional phase lock loop circuit and is well known to those skilled in the art.

Considering now the pixel clock generator 26 in greater detail with reference to FIG. 6B, the pixel clock generator 26 is a conventional phase lock loop arrangement including a phase comparator 66, a low pass filter 67, a voltage control oscillator 68, and a divider 69. The reference clock signal HSYNC received from the video drive module 14 is coupled to the input to the phase comparator 66. The output pixel clock signal PXCLK is derived from the output of the voltage control oscillator 68.

As will be explained hereinafter in greater detail, the active matrix panel 16 requires digital RGB video data in order to display information properly. More particularly, the digital RGB video data must be assembled into two 8-bit bytes of subpixel component information. For this purpose, in order to drive a selected set of corresponding subpixel components from the data stored in the bit map memory arrays, such as the array 30 (FIG. 2), the video controller 18 and video clock generator 28 cooperate together for switching rapidly a selected set of subpixel components into their respective color-producing states or conditions for each pixel location or element.

Considering now the assemblying and transferring of data to the active matrix panel 16 in greater detail, the video controller 18 couples the RGB digital signals stored in the bit map memory arrays, such as array 30, to the active matrix panel 16 so that each subpixel component is turned on and off, to cause a viewer to perceive distinct color shadings and hues of a displayed image visually.

As best seen in FIG. 1C, each of the color enhancing units convert one color element of the RGB video analog signal into a converted binary digital signal indicative of a weighted intensity or shading level of the primary color to be produced at the addressed pixel location in the active matrix panel 16. In this regard, unit 20 converts the red component of the RGB signal for all the red subpixels components, unit 22 converts the green component of the RGB signal for all the green subpixels components, and unit 24 converts the blue component of the RGB signal for all the blue subpixels components in the active matrix panel 16.

Considering now the operation of the controller 11 in greater detail, each of the color enhancing units 20, 22 and 24 convert an associated color component portion of the RGB analog signal into an 8-bit digital signal which is subsequently quantized into a 3-bit digital signal.

As will be explained hereinafter in greater detail, each three bit digital signal is assembled into a six bit byte for storage and subsequent retrieval from the associated enhancing unit. In this regard, it should be understood that the six bit byte is indicative of the color shading or hue of one primary color for two pixel locations. For example, the first 3-bit group would be for the red component of pixel location 1 while the second 3-bit group would be for the red component of pixel location 2.

The memory controller 40 in cooperation with the video controller 18 and video clock generator 28 enables the stored quantized data to be rapidly and asynchrously retrieved from each color enhancing unit. In this regard, as each 6-bit byte is retrieved from storage, the associated color enhancing unit further reduces or scales each three bit grouping to a single bit binary single.

Each single bit binary signal is than latched into the video controller 18 with its associated color component single bit binary signals from the other color enhancing units to form a color grouping (red, green, blue) for a given pixel location. As will be explained hereinafter, each subsequent grouping of three bits for each pixel location is also latched into the video controller 18 until a minimum of nine bits of video data has been stored. The first eight bits of the assembled data is then transferred to the active matrix panel 16 for display purposes. The video controller 18 controls the assembly of the video data from the color enhancing units 20, 22 and 24 so that the quantized data is properly assembled and transferred to the active matrix panel 16.

From the foregoing, it should be understood that the video controller 18 actively assembles two 8-bit bytes of video data, and even bit grouping and an odd bit grouping because data is retrieved from the color enhancing units in a single 6-bit byte which is indicative of two 3-bit groupings as previously explained.

Considering further the operation of the controller 11, the quantized binary digital signals in each one of the enhancing units 20, 22 and 24 are synchronously coupled to the video controller 18 for each pixel location and interfaced to the active matrix panel 16 so that the selected pixel or picture elements may be turned off and on, for predetermined periods of time, to produce the desired shading in each of the primary colors. In operation, the individual ones of the RGB color component signals are into an 8-bit digital signal for quantizing purposes. In this regard, the digitized signals are coupled to a buffer and scaling generator 35 which quantizes selected portion of the digital signals to produce a 3-bit digital signal indicative of a shading level of color. The 3-bit digital signal is then stored so that it may be repeatedly retrieved at a sufficiently fast rate to enable the high speed display device 16 to be properly refreshed for visual display purposes.

In order to reduce the 3-bit quantized signal into a single bit binary signal for driving the high speed display device 16, the quantized digital signal is retrieved from storage and compared with a repetitive set of randomly generated digital signals in scaling generator 42. The repetitive set of digital signal are arranged in a predetermined order and are indicative of a corresponding fixed or predetermined weighted intensity or shading level of color.

The randomly generated digital signals are compared against the quantized digital signals to determine whether the numerical value of the quantized signals is greater than the numerical value of a randomly generated signal. If the quantized digital signal is greater than the repetitive digital signal, a single bit binary signal is generated for that subpixel component causing the addressed subpixel component of the corresponding pixel location address to be switched on and off to produce the desired color shading, without introducing any substantial flicker in the displayed color image and without causing unwanted and undesired patterning in the displayed image.

In summary, the predetermined sequence of the repetitive digital signal has an averaging effect over a series of image frames to substantially eliminate flicker as described in the above-mentioned parent patent application as well as patterning associated with repetitive "beats" in the displayed image. In addition, scaling the converted analog video signal eliminates or at least substantially reduces both contouring or splotchiness caused by the quantizing error associated with approximations of digital pictures.

Considering now the interface controller 11 in greater detail with reference to FIGS. 1C and 2, the three enhancing units 20, 22 and 24 are coupled to the R, G and B video drive signals respectively generated by the personal computer 12 video drive module 14. As the circuitry and operation of each of the enhancing units 20, 22 and 24 are substantially identical only the red color enhancing unit 20 will be described hereinafter in greater detail.

Figure 2A:
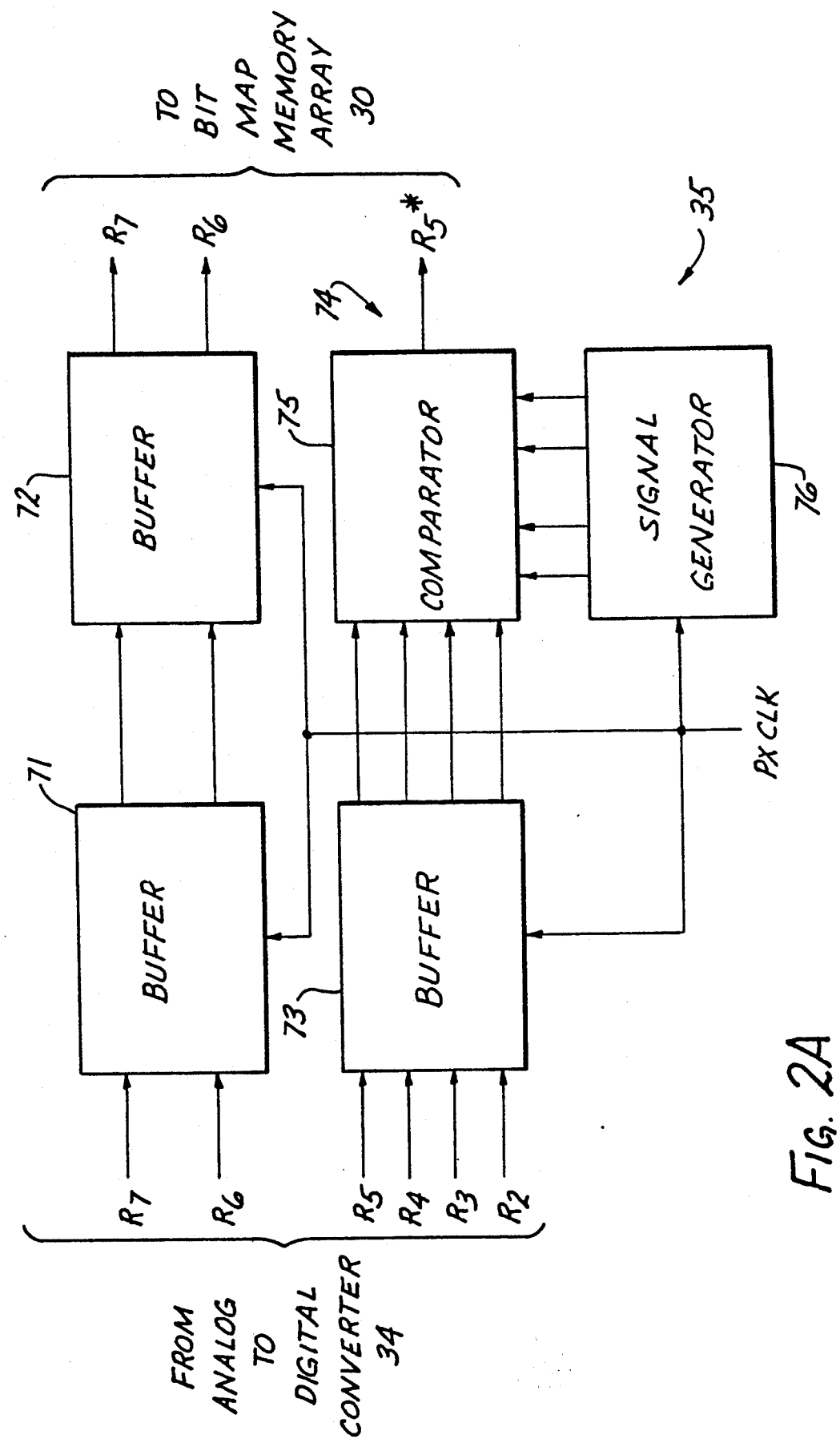
FIG. 2A is a functional block diagram of a buffer latch and scaling generator of the unit of FIG. 2.

Considering now the enhancing unit 20 in greater detail with reference to FIG. 2, the enhancing unit 20 comprises a translating arrangement 32 that generally includes a conventional analog to digital converter 34 for translating the red component of the video analog signal into an 8-bit digital signal that is indicative of a weighted intensity or shading level of a single color such as red, and a buffer latch and scaling generator 35 for quantizing a selected portion of the lower order bits of the digital signal into a single digital signal shown as $R_5^*$ (FIGS. 2 and 2A). In this regard, the quantizing of the lower order bits of the digital signal, controls the hue of the red color component of the RGB video signal so that it may be properly mixed with the other color components (green hues and blue hues) produced by the enhancing units 22 and 24 respectively to produce over a quarter of a million different colors for display purposes. The buffer latch and scaling generator 35 temporarily storing the two most significant bits of the digital signal, so that data moving through the enhancing unit 20 can be properly synchronized and stored in the bit map memory array 30.

The enhancing unit 20 also includes the bit map memory array 30 for storing the red hue data and a sealing generator 42 for reducing the red hue data to a sample binary bit for each of the red subpixel components in the active matrix panel 16.

Considering now the buffer latch and scaling generator 35 in greater detail with reference to FIGS. 2 and 2A, the scaling generator 35 includes a pair of buffer registers 71 and 73 for temporarily storing the 6 most significant bits of the 8-bits of video digital data. As best seen in FIG. 2, the two least significant bits of the 8-bit digital signal indicative of the red color components are insignificant for quantizing purposes and are thus, not coupled to the buffer and scaling generator 35.

As best seen in FIG. 2A, the output video digital data from the analog to digital converter 34 is latched into buffers 71 and 73 respectively by the PXCLK signal generated by the pixel clock generator 26. The output of the buffers 71 and 73 are connected to a secondary buffer latch 72 and a bit quantizing arrangement 74 respectively. In this regard, the bit quantizing arrangement 74 converts the 4-bit output signal of buffer 73 into a single bit binary signal while the secondary buffer 72 continues the temporary storage of the two most significant bits of the video data.

Considering now the bit quantizing arrangement 74 in greater detail with reference to FIG. 2A, the bit quantizing arrangement 74 generally comprises a comparator circuit 75 and a signal generator circuit 76 whose output signals change in a predetermined randomly sequenced manner on every pixel clock signal (PXCLK). In this regard, the output signals of the signal generator 76 are arranged to quantize the 4-bit video digital signal from latch buffer 73 into a single bit binary signal based upon a predetermined randomized sequence that effects quantization with substantially less quantizing errors.

In order to convert the 4-bit output signal of buffer 73 into a single bit binary single, the comparator circuit 75 is coupled between the 4-bit output signal generator 76 and the 4-bit output signal of the buffer 73. Comparator circuit 75 determines whether the numerical value of the 4-bit digital output signal (signal B) of buffer 73 exceeds the numerical value of the 4-bit digital output signal (signal A) of generator circuit 76, and generates a single bit digital output signal ($R_5^*$) whenever the numerical value of signal B exceeds the numerical value of signal A. The output signal (signal $R_5^*$) of the comparator circuit 75 is synchronized with the pixel clock signal (PXCLK) for storing the quantized video data signal $R_5^*$ along with the two most significant bits (R7 and R6) of the converted signal into the bit map memory array 30.

Considering now the signal generator circuit 76 in greater detail with reference to FIG. 2A, the signal generator 76 has a predetermined counting sequence for 16 levels of quantizing. The counting sequence of the signal generator 76 permits the quantized signals to be average over a large number of frames of pixel data without introducing a significant amount of quantizing errors. In this regard, the counting sequence could be substantially identical to that of the signal generator described in parent application Ser. No. 07/472,668 which may be referenced for a fuller explanation of the counting sequence.

In order to facilitate the orderly converting, scaling and storing of the analog video data signal indicative of the red color component into the bit map memory array 30, a pixel clock signal produced by the pixel clock generator 26 sequentially steps the data into the array 30. For example, on a first pixel clock, the analog data signal is converted into a set of digital signals (R0-R7, FIG. 2) by the analog to digital converter 34. On a second pixel clock, the converted data is latched by buffers 71 and 73. On the next pixel clock the data is simultaneously scaled and latched by the quantizing arrangement 74 and the buffer latch 72. On the next pixel clock, the latched and quantized data is transferred to and stored in the bit map memory array 30.

In order to accelerate the transferring of the red hue data stored in the bit map memory array 30 to the active matrix panel 16, the data in the memory array 30 is stored and retrieved in one 6-bit byte having 3-bits of even data and 3-bits of odd data. In this regard, the bit map memory array 30 includes a VRAM memory 85 having a pair bit map memory units 37 and 38 respectively (FIG. 3) for storing the two most significant bits (R7 and R6) of the 8-bit digital red color signal as well as the quantized single bit value ($R_5^*$) for the next four most significant bits of the 8-bits of digital data. The retrieved data from the bit merge memory array 30 is designated as R7E-R5E and R7$\phi$ and R5$\phi$ respectively (FIGS. 2 and 3).

Also, in order to accelerate the transferring of the red hue data stored in the bit map memory array 30 to the active matrix panel 16, the video clock generator 28 produces a very fast memory access clock signal (CLKA) for helping to pack the retrieved video data into 16 bit bytes and a slower video clock signal (CLKB) for transferring the 16 bit byte video data to the active matrix panel 16. In this regard, the memory access clock signal CLKA is used to read the red hue component data from the array 30 and to continue stepping the data into the video controller 18.

When the red hue component data is read from the memory array 30, it is transferred to the scaling generator 42 (FIGS. 2 and 4) for eliminating patterning and flickering in the red hue components of the displayed image.

Considering now the memory array 30 in greater detail with reference to FIG. 3, the memory array 30 includes the VRAM memory 85 having the pair of bit map memory units 37 and 38 for storing the quantized video data The VRAM memory 85 is a 256 K×4 VRAM Mos memory such as manufactured by Texas Instrument under part number TMS44C251-10 and more particularly described in a Texas Instrument book entitled "Mos Memory Data Book" (1989) Section IV pages 79–118.

The VRAM memory 85 generally includes a set of 6 DRAM's in a 512×512×4 configuration coupled to a corresponding set of SAM's having a 512×1×4 configuration. In this regard, it should be understood that although the bit map memory array 30 is shown including a full VRAM memory it will be understood that a single VRAM memory could be used for all the bit map memory arrays in controller 11.

As best seen in FIGS. 2 and 3, the memory array 30 is coupled between the buffer and scaling generator 35 and the scaling generator 42 and is utilized for storing the quantized video data produced by the buffer latch and scaling generator 35.

In order to assembly subpixel data for two pixel elements bytes, the memory array 30 includes a pair of buffer latches 82 and 84 for temporarily storing the video data produced by the buffer and scaling generator 35. The memory controller, shown generally at 40, provides all the control signals for transferring data into and out of the various bit map memory arrays, such as array 30. In this regard, the memory controller 40 generates a pair of signals synchronized with the horizontal sync signal (HSYNC) and pixel clock (PXCLK) for loading video data alternately first into latch 82 and then into latch 84.

Once two three-bit bytes of data have been loaded into the latches 82 and 84 the memory controller 40 generates a write control signal for causing the latched data to be stored into a selected portion of the VRAM memory 85 of the memory array 30. It should be understood loading the data in a 6-bit bytes enables the stored data to be retrieved from the memory arrays at a much faster rate.

Considering now the scaling generator 42 in greater detail with reference to FIGS. 2 and 4, the scaling generator 42 includes an even bit unit 44 and an odd bit unit 48. Each of the units 44 and 48 are substantially identical so only even bit unit 44 will be described hereinafter in greater detail.

As best seen in FIG. 4, the even bit unit 44 includes an even bit buffer latch 45 for temporarily storing the three even bit output signals R7E, R6E, and R5E of the bit map memory array 30. The output of latch 45 is connected to a scaling arrangement 47 that converts the 3-bit output signal from memory array 30 into a single bit binary signal shown as $R_e$ that helps to produce the desired shading level of the red component of the subpixel elements without introducing any substantial flicker in a selected pixel element.

The scaling arrangement 47 includes a comparator 47A and a signal generator 48B for generating a single bit binary output signal ($R_e$). The scaling arrangement 47 is similar to the quantizing arrangement 74 discussed earlier herein except that it compares the 3 bit output signal from latch 45 with a 3-bit binary signal produced by signal generator 47B. In this regard, the signal generator has a different counting sequence than generator 76, but its function is substantially similar; i.e., to reduce the 3-bit signal to a single bit binary signal. As the 3-bit signal generator is more fully described in the aforementioned patent application it will not be described in greater detail.

Figure 5:
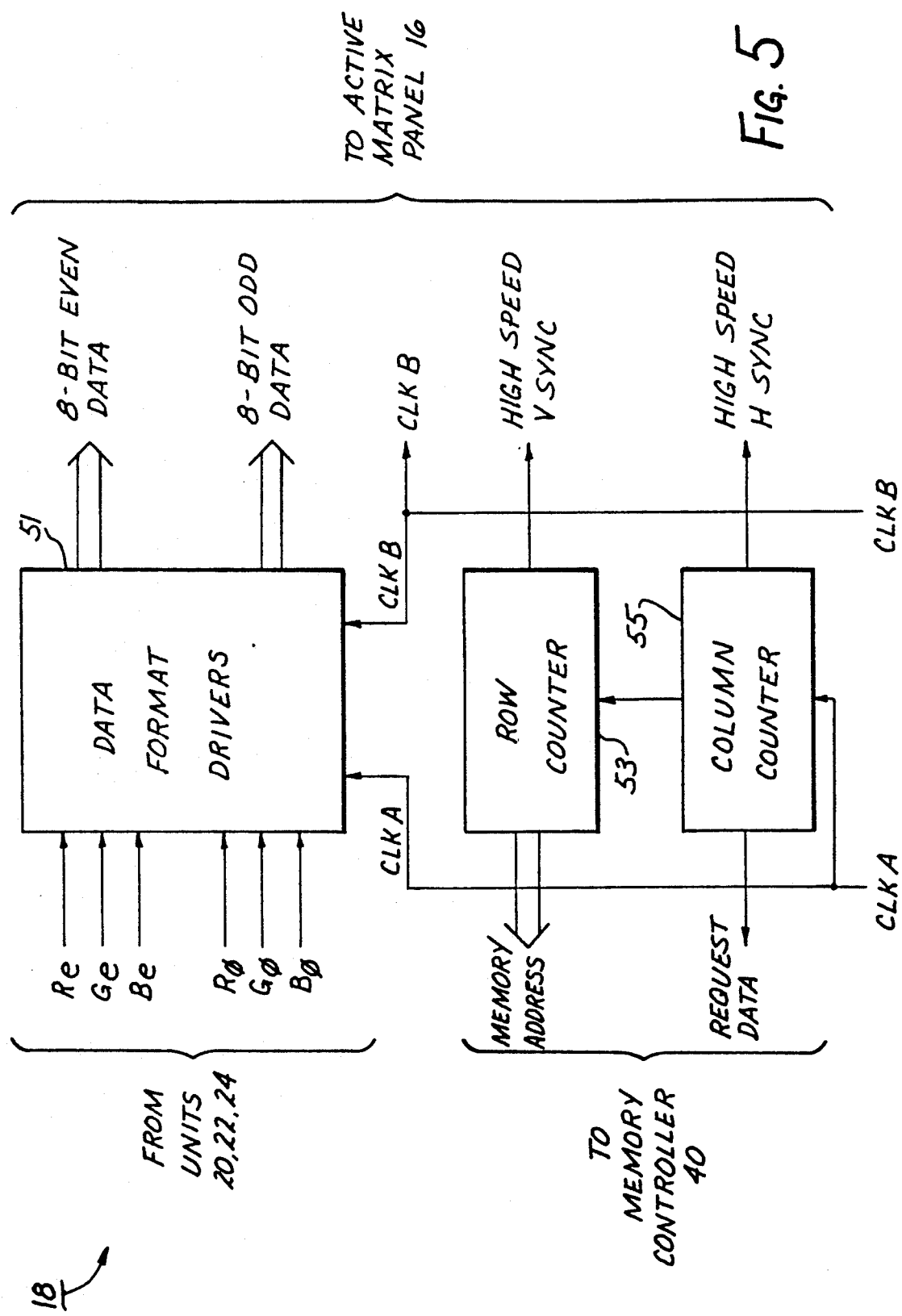
FIG. 5 is a functional block diagram of a video controller of the high speed color enhancing interface controller of the system of FIG. 1A.

Considering now the video controller 18 in greater detail with reference to FIGS. 1C and 5, the video controller 18 generally includes a data format driver 51 for arranging the red, green and blue color hue components received from translators 20, 22 and 24 in proper format for driving the active matrix panel 16 as well as a row counter 53 and a column counter 55 for generating the high speed vertical sync and high speed horizontal sync signals respectively.

As best seen in FIG. 5, the row counter 53 also generates the memory address signals for the memory controller 40 as well as the high speed vertical sync signal for the active matrix panel 16. The row counter 53 is coupled to the column counter 55 and is synchronized with the high speed horizontal sync signal generated by the column counter 55. In this regard, the high speed horizontal sync signal increments the row counter 53 on every high speed horizontal sync signal. The column counter 55 also generates a request data line signal for the memory controller 40 in order to retrieve data from the bit map memory arrays, such as array 30.

In operation, the video controller 18 operates synchronously from the conventional video output signals produced by the personal computer 14. In this regard, the video controller 18, accesses the quantized video data in enhancing units 20, 22 and 24 at a rate that is sufficiently fast that any translation data gaps that may occur between storing and reading data to and from the bit map memory arrays cannot be visually perceived by a viewer of the display system.

Referring now to FIGS. 1C, 2 and 2A, RGB video data from the computer video output 14 is sequentially stepped into the enhancing units 20, 22 and 24, converted into an 8-bit digital signal, and then quantized into 3-bits of data for each respective primary color. The 3-bits of data for each primary color is then stored into the respective bit map memory arrays, such as array 30 in enhancing unit 20, synchronously of the high speed memory access clock signal (CLKA) generated by the video clock generator 28.

Once the quantized data has been stored in the respective bit map memory arrays, the video controller 18 generates a request for new line data signal via the column counter 55 and a memory address via the row counter 53. These signals are coupled to the memory arrays, such as array 30, which respond by transferring the data stored in the selected bit map memory locations to the scaling generator 42 (FIGS. 2 and 4). Subsequently, on each memory access clock signal (CLKA), the accessed data is stepped through the generator 42 (FIG. 4) until a pair of single on/off color hue component signals ($R_e$ and $R_0$) are generated for the selected pixel addresses.

As will be explained hereinafter in greater detail, the pair of on/off color hue component signals $R_e$ and $R_0$ are assembled with corresponding signals $G_e$, $B_e$ and $G_0$, $B_0$ respectively to form two separate subpixel groupings ($R_e$, $G_e$, $B_e$ and $R_0$, $G_0$, $B_0$) for two separate pixel elements in the pixel array of the active matrix panel 16.

The separate red, green and blue color hue component signals from each respective enhancing units are then latched into the data format driver 51 (FIG. 5A) which sequentially formats the color hue data for transfer to the active matrix panel 16 as will be described hereinafter in greater detail. Data transferred to driver 51 is stepped to the active matrix panel 16 on the high speed horizontal sync signal which is synchronized with the video clock signal (CLKB).

Figure 5A:
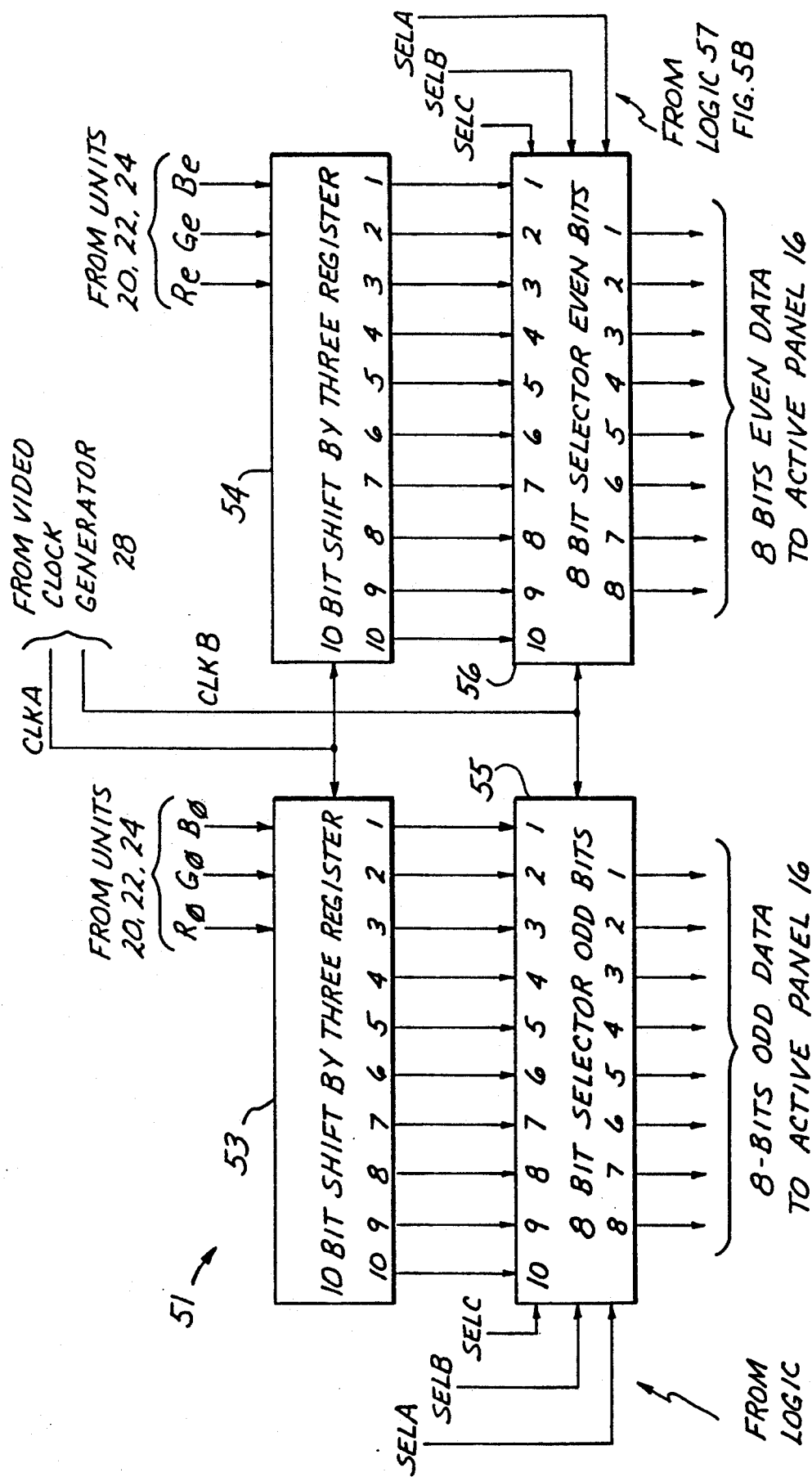
FIGS. 5A and 5B, when arranged as shown in FIG. 5C, illustrate a functional block diagram of a data format drivers of the video controller of FIG. 5.
Figure 5B:
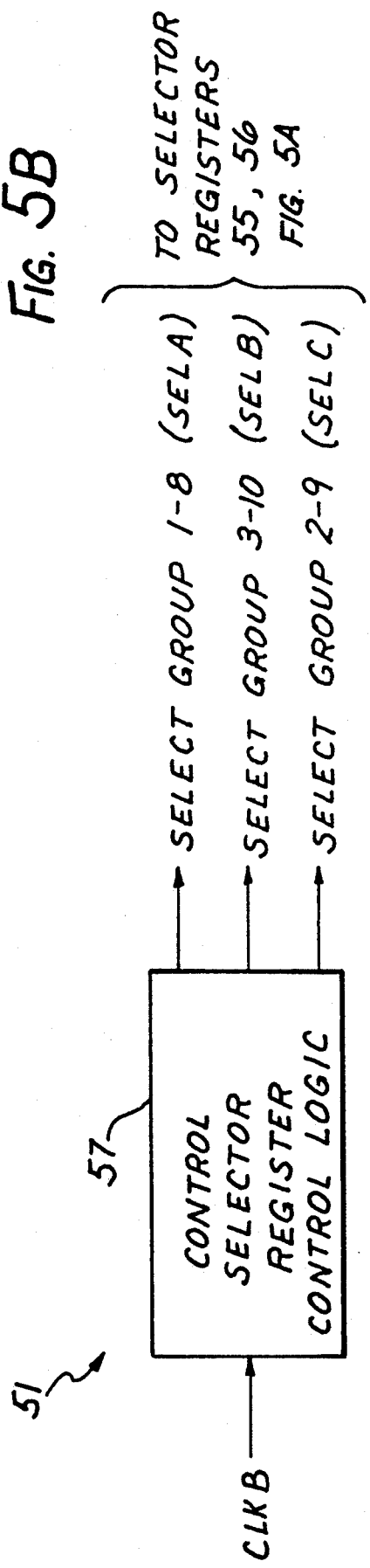
Figure 5C:
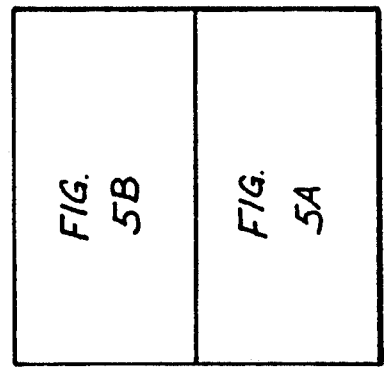

Considering now the data format driver 51 in greater detail with reference to FIGS. 5A, 5B and 5C, the data format driver 51 generally comprises a pair of 10 bit shift by three registers 53 and 54 for storing the subpixel data from units 20, 22 and 24 and a pair of 8 bit selector registers for transferring the data assembled in registers 53 and 54 to the active matrix panel 16.

As best seen in FIG. 5A, register 53 stores the even-bit data ($R_e$, $G_e$, $B_e$) while register 54 stores the odd-bit data ($R_0$, $G_0$, $B_O$) from units 20, 22 and 24. Subpixel data is loaded into the shift registers 53 and 54 every CLKA time from the enhancing units 20, 22 and 24 and is shifted three bit every CLKA time.

Data from the shift registers 53 and 54 is loaded in parallel into registers 55 and 56 respectively every CLKB time. In this regard, CLKA and CLKB are synchronized so that only after the shift registers are fully loaded with subpixel data does the transfer to the selector registers 55 and 56.

As best seen in FIG. 5B, the data format driver 51 also includes a control logic circuit 57 for controlling the latching or transferring of video data from the 10 bit shift by three registers 53 and 54 into the 8-bit selector registers 55 and 56 respectively. In this regard, the control logic circuit 57 is a conventional two bit counter and decoder arrangement for generating three control signals SELA, SELB and SELC respectively.

The two bit counter changes states on every CLKB signal. In this regard, only one of the three control signals SELA, SLKB, or SELC will be a logic high or "1" during any given period of time.

As previously noted, the control signals SELA, SELB and SELC enable selected groups of the video data bits stored in the 10 bit shift by three registers to be latched into the 8-bit selector register.

FIG. 5C illustrates the arrangement of FIGS. 5A and 5B to show the data format driver 51. Table I shows the relationship between the control signals and which bits are latched into the selector register:

TABLE I

| | |
|---|---|
| SELA "1" | BITS 1-8 REG. 53 TO BITS 1-8 REG. 55 |
| SELB "1" | BITS 3-10 REG. 53 TO BITS 1-8 REG. 55 |
| SELC "1" | BITS 2-9 REG. 53 TO BITS 1-8 REG. 55 |
| SELA "1" | BITS 1-8 REG. 54 TO BITS 1-8 REG. 56 |
| SELB "1" | BITS 3-10 REG. 54 TO BITS 108 REG. 56 |
| SELC "1" | BITS 2-9 REG. 54 TO BITS 1-8 REG. 56 |

As best seen in FIG. 5A video data from the scaling generators, such as scaling generator 42, are transferred into the 10-bit shift by three registers 53 and 54. Bits 1-3 of the shift registers 53 and 54 are loaded on every CLKA signal and shifted 3 bits to the left on every subsequent memory access clock signal (CLKA) until transferred and latched into the 8-bit selector registers 55 and 56 respectively.

Considering now the video clock generator 28 in greater detail with reference to FIG. 6A, the video clock generator 28 includes a crystal oscillator 60 for generating a reference clock signal (RCLK). The reference clock or RCLK signal is coupled to a pair of conventional clock generators 62 and 64 for generating the high speed memory access clock signal (CLKA) and the slower video clock signal (CLKB). As the clock generators 62 and 64 are conventional they will not be described hereinafter in greater detail.

As best seen in FIG. 6A, the video data clock CLKB produces a clock signal on every third RCLK signal for permitting the video data retrieved from the memory arrays, such as memory array 30, to be packed into two eight bit bytes for transfer to the active matrix panel 16. The manner in how the retrieved memory array data is packed into the eight bit bytes will be described hereinafter in greater detail.

With reference to the memory access clock signal (CLKA), it should be noted that it corresponds to the reference clock signal (RCLK) except that every ninth clock of the RCLK signal, the CLKA clock signal is inhibited. Inhibiting the clock signal as described above, permits the memory access clock signal (CLKA) and the video data clock signal (CLKB) to remain in synchronization as best seen in FIG. 6A.

Considering now the memory controller 40 in greater detail with reference to FIGS. 1C, 2 and 3, the memory controller 40 is configured from a field programmable gate array (FPGA) configured to provide the necessary control and addressing signal based upon the data provided in the Texas Instrument "MOS Memory Data Book" previously referenced. In this regard, as one skilled in the art could easily program the FPGA to provide the necessary control and addressing signals, the memory controller 40 will not be described in greater detail.

Referring now to FIGS. 7-11, there is illustrated another high speed display system 109 which is also constructed in accordance with the present invention, and which is adapted for use as a direct view video display system capable of displaying millions of different color shadings. Thus, system 109 is a high speed video color display system.

Figure 11:
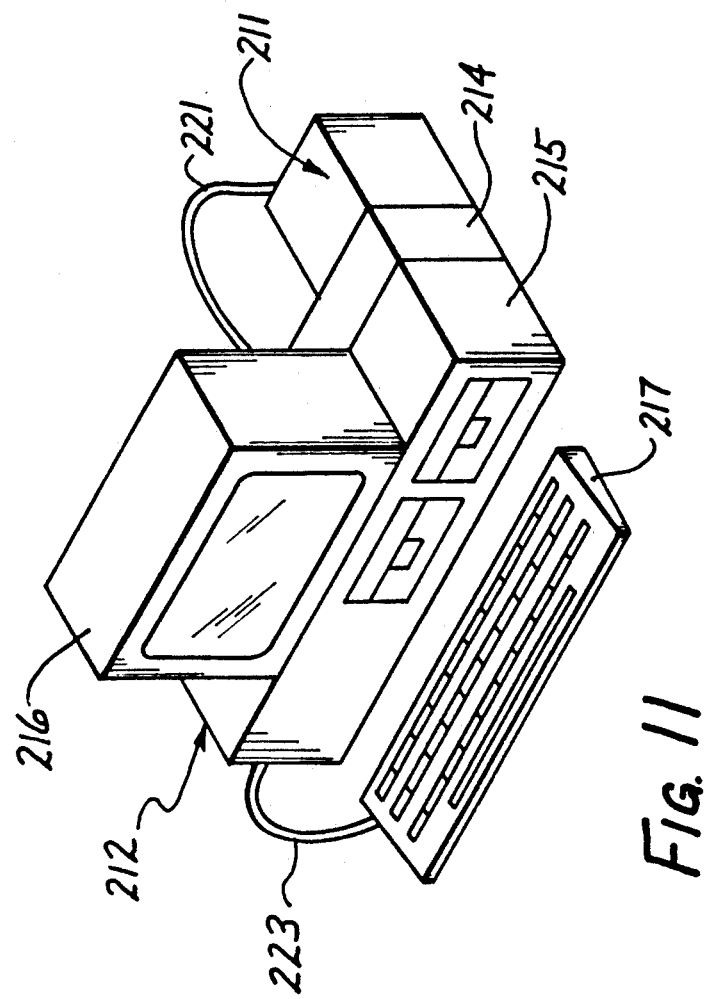
FIG. 11 is a diagrammatic view of the high speed color enhancing interface controller of FIG. 7, and the personal computer employing it.

As shown in FIG. 11, the system 109 is adapted for use in an arrangement employing a lap top computer 112 having a video drive module 114, a direct view monitor, such as a thin film transistor active matrix liquid crystal display panel 116, and a keyboard 117.

The system 109 is similar to system 10 except that it employs a direct view active matrix panel 116 in a lap top computer arrangement with a high speed color enhancing controller 110 which is capable of enabling the panel 116 to display approximately ($2^{16}+16+16 = 2^{48}$) different shadings of colors.

The interface controller 110 is used to accelerate the slower conventional video drive signals produced by the video drive module 114 of a conventional personal computer, such as the computer 112, into high speed video drive signals for use by the high speed display device 116 and to quantizes the analog signal into a set of digital signals for helping to facilitate the production of millions of different color shadings and hues. More particularly, the interface controller 110 permits the active matrix panel 116 to display up to $2^{48}$ simultaneous different colors. In this regard, the video drive module 114 sends conventional RGB video signals including horizontal and vertical sync signals to the interface controller 110 while the controller 110 provides the necessary control functions to interface the high speed display device 116 with the computer 112.

As best seen in FIG. 11, a cable 121 and means not shown interconnect the interface controller 110 between the video drive module 114 and the high speed display device 116, respectively. The unit 110 receives information from the computer processing unit 115 via module 114 for storage and display on the high speed display device 116 via cable 121. The keyboard 117 is interconnected to the processing unit 115 by a cable 123.

Figure 7:
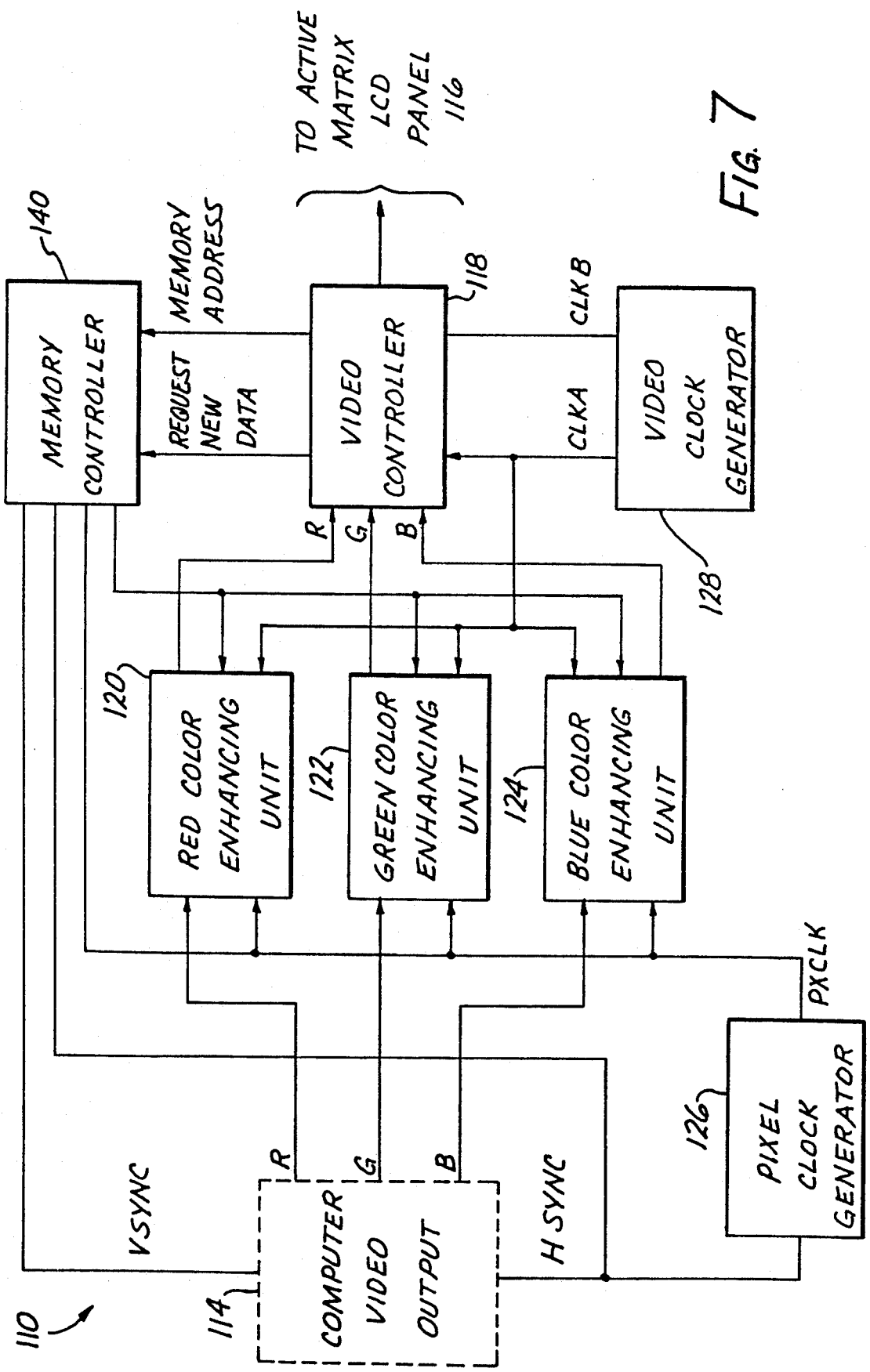
FIG. 7 is a block diagram of another high speed color enhancing interface controller, which is also constructed in accordance with the present invention, and which may be employed in a personal computer employing a high speed display.

Referring now to FIG. 7, there is shown a high speed color enhancing interface controller 110 which is also constructed in accordance with the present invention. The controller 110 is adapted to be used with a conventional personal computer having a video drive module 114 for generating a video output signal indicative of a color image for visual display purposes.

The controller 110 is substantially identical to controller 11 but includes a set of color enhancing units 120, 122 and 124 adapted to quantize 16-bits of video RGB data for each primary color into 4-bits of color hue data. The controller 110 includes a pixel clock generator 126, a memory controller 140, a video controller 118 and an associated video clock generator 128 for interfacing the video drive module 114 to an active matrix panel 116 which is substantially similar to panel 16. As the video controller 118, memory controller 140, pixel clock generator 126 and video clock generator 128 are substantially similar to controllers 18 and 40 and clock generators 26 and 28 they will not be described hereinafter in greater detail.

Figure 8:
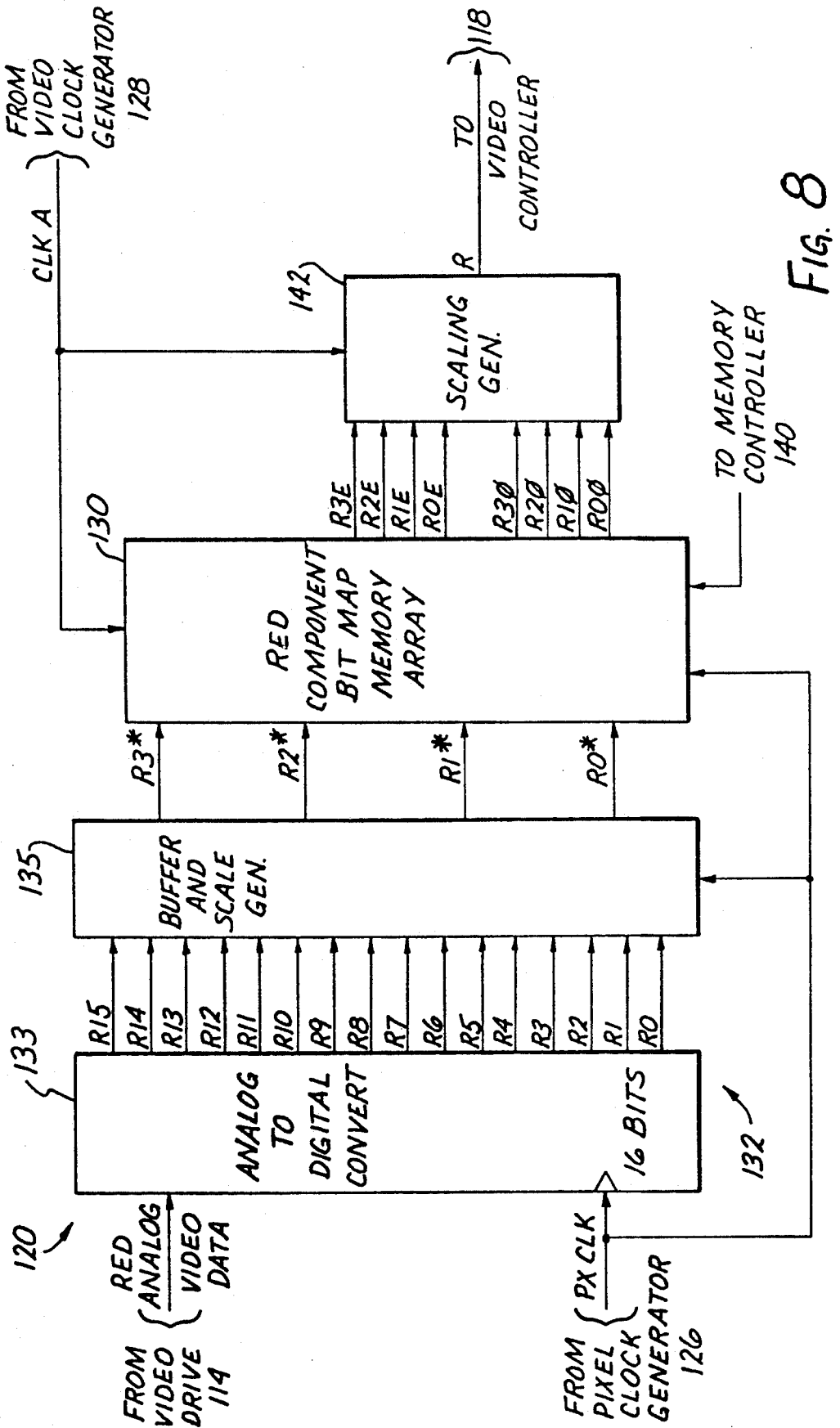
FIG. 8 is a block diagram of one of the color enhancing units in the high speed color enhancing interface controller of FIG. 7.

Considering now the high speed color display controller 110 in greater detail with reference to FIGS. 7 and 8, the three enhancing units 120, 122 and 124 are electrically coupled between the video drive module 114 and the video controller 118 in order to eliminate or at least substantially reduce contouring or splotchiness caused by quantizing the analog RGB signal produced by the computer 114. As the enhancing units 120, 122 and 124 are substantially identical, only unit 120 will be described hereinafter in greater detail.

Considering now the enhancing unit 120 in greater detail with reference to FIG. 8, the unit 120 generally comprises a scaling arrangement 132 for quantizing the analog video data indicative of the red color components of the RGB video signal into 4-bits of data to substantially reduce or eliminate contouring or splotchiness. In order to store the quantized data for accelerating purposes, the unit 120 also includes a bit map memory array 130 having two bit map memory units (not shown). Bit map memory array 130 is substantially identical to bit map memory array 30 except that it stores 8 bits of data as opposed to 6 bits of data.

In order to reduce the red hue component data a single bit binary signal the enhancing unit 120 also includes a scaling generator 142. In this regard, the bit map memory array 130 is electrically coupled between the scaling arrangement 132 and a scaling generator 142.

In operation, the scaling arrangement 132 converts the analog video data indicative of the red color components of the RGB video signal into sixteen bits of discrete digital data which is quantized into 4-bits of data. The 4-bits of quantized data are sequentially stored in the bit map memory array 130 where the quantized data is subsequently retrieved for display purposes by the video controller 118. As the operation of video controller 118 is substantially identical to controller 18 it will not be described hereinafter in greater detail.

Figure 9:
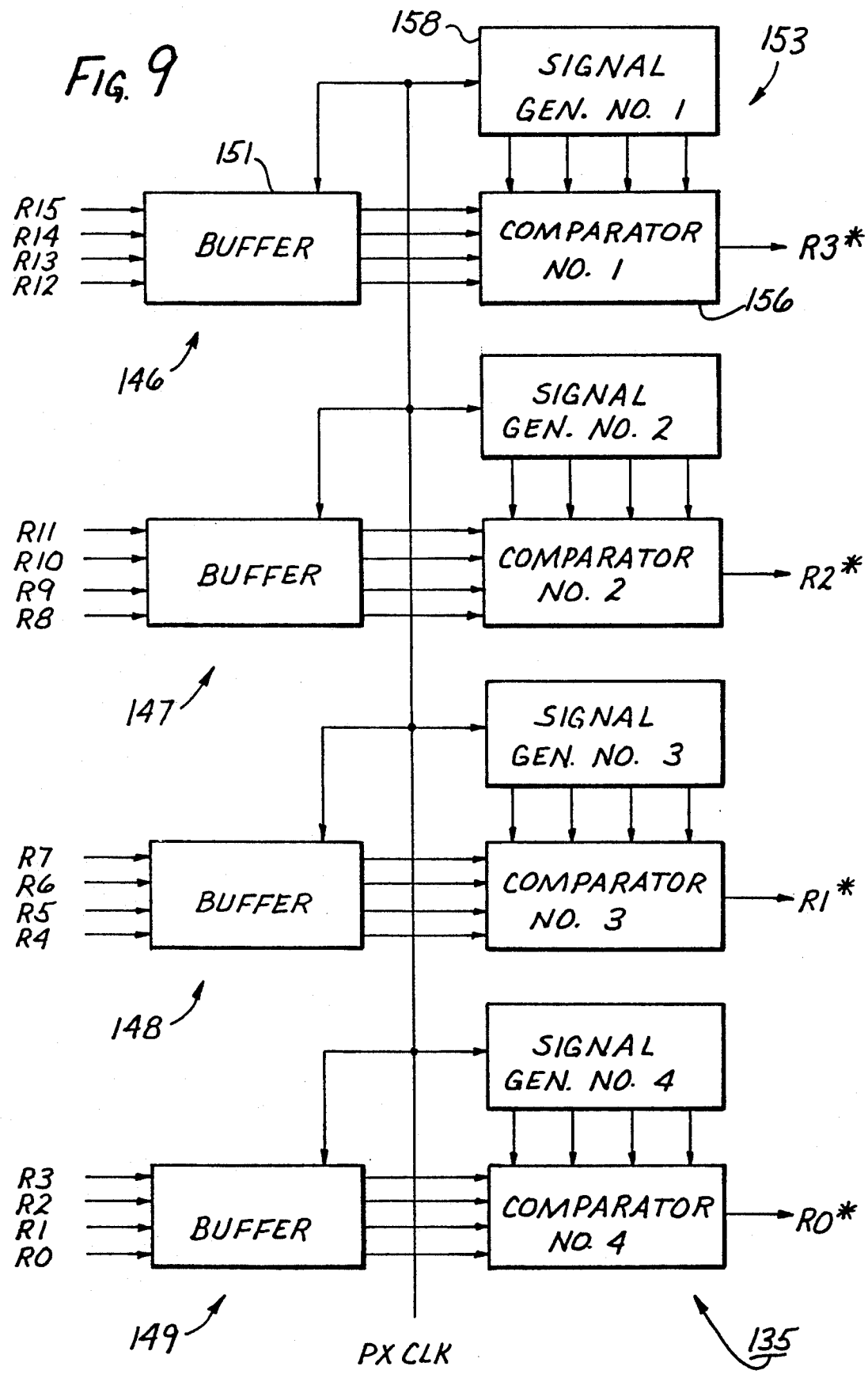
FIG. 9 is a block diagram of the buffer latch and scale generator of the color enhancing unit of the unit of FIG. 8.
Figure 10:
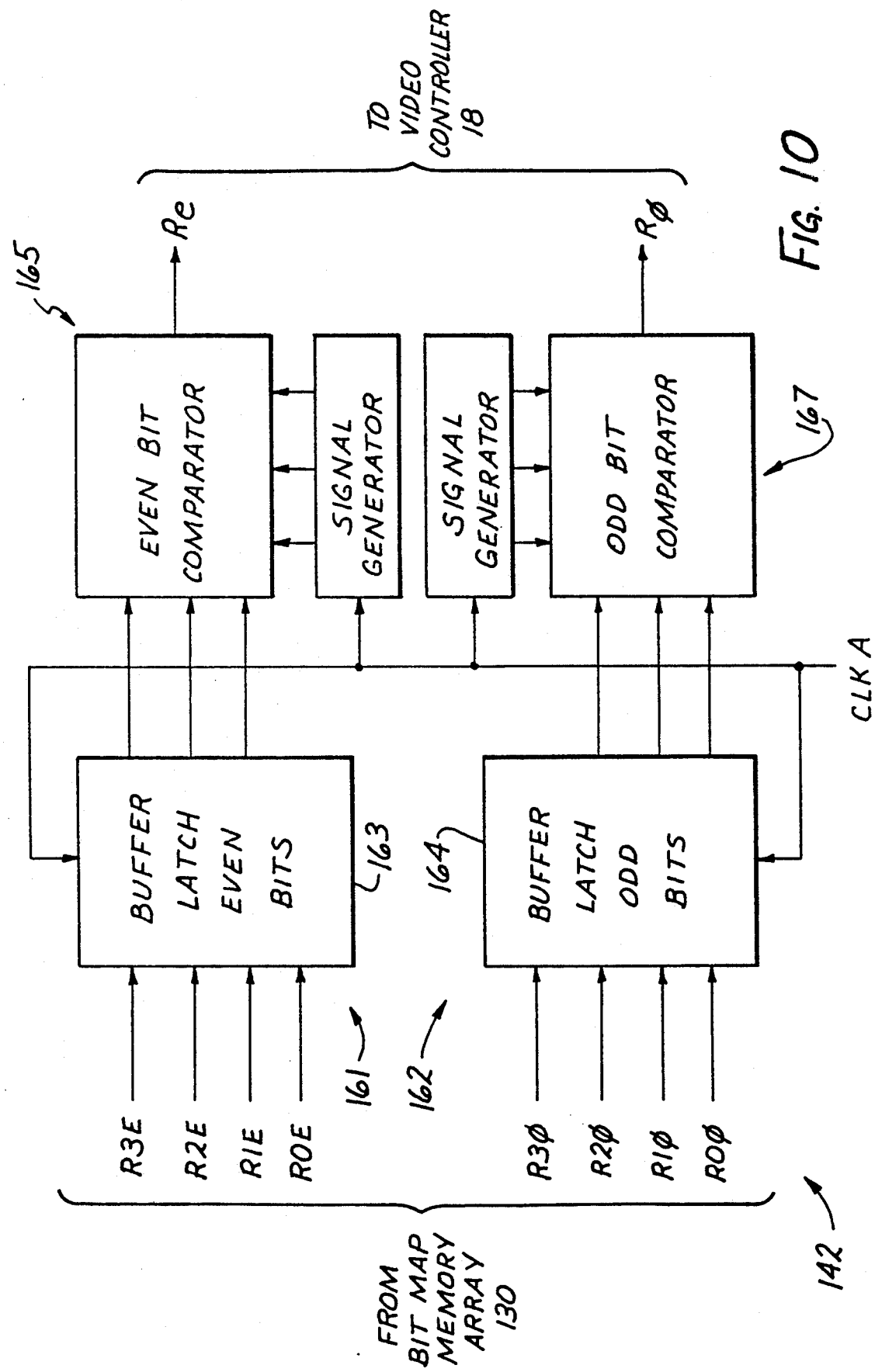
FIG. 10 is a block diagram of the scaling generator of the unit of FIG. 8.

Considering now the scaling arrangement 132 in greater detail with reference to FIGS. 8 and 9, the scaling arrangement 132 includes an analog to digital converter 133 for converting the analog video data signal into 16-bits of digital data, and a buffer and scaling generator 135 for quantizing the 16-bits of digital data into 4-bits of digital video data in order to eliminate or at least substantially reduce contouring or splotchiness otherwise caused by quantizing errors associated with approximations of digital pictures. The analog to digital converter 133 is conventional circuitry.

Considering now the buffer and scaling generator 135 in greater detail with reference to FIG. 7, the buffer and scaling generator 135 includes four quantizing units 146, 147, 148 and 149 respectively. As each quantizing unit is substantially identical, only quantizing unit 146 will be described hereinafter in greater detail.

In order to synchronize the scaling generator 135 signals with the bit map memory array 130, the pixel clock generator 126 is utilized to step the analog video data indicative of the red color components through each successive stage of the respective color enhancing units 120, 122 and 124 respectively. In this regard, each enhancing unit consists of 4 successive stages: a first stage for converting the analog video data to digital data; a second stage for quantizing the 16-bits of digital data into 4-bits of video data; a third stage for storage of the quantized video data to allow its subsequent repetitive retrieval at a much greater retrieval rate; and a fourth stage for scaling the 4-bits of video data into a single digital signal indicative of the red hue color components for the image to be displayed.

Considering now the quantizing scaling unit 146 in greater detail with reference to FIG. 7, the quantizing unit 146 generally includes a buffer or latch 151 that temporarily stores the four most significant bits of digital data (R15-R12) coupled from the analog to digital convertor 133. The output of latch 151 is electrically connected to a duty cycle signal generator 153 that converts the 4-bit output signal of latch 151 into a single bit binary signal that produces the desired quantization without introducing any substantial quantizing errors as will be explained hereinafter in greater detail.

As best seen in FIG. 7, the duty cycle signal generator 153 generally comprises a comparator circuit 156 and a signal generator circuit 158 whose output signal changes in a predetermined randomly sequenced manner on every pixel clock signal. In this regard, the output signals of the signal generator 158 are arranged to translate the 4-bit output signal of buffer 151 in a predetermined randomized sequence that minimizes quantizing error associated with approximations of digital pictures.

In order to convert the 4-bit output signal of the buffer 151 into a single bit binary signal, the comparator circuit 156 is coupled between the 4-bit output signal generator 158 and the 4-bit output signal of the latch 151. Comparator circuit 156 determines whether the numerical value of the 4-bit digital output of the latch 151 exceeds the numerical value of the 4-bit digital output signal of the signal generator circuit 158, and generates a single bit digital output signal whenever the numerical value of the output of latch 151 exceeds the numerical value of the output of generator 158. The binary output signal of the comparator 156 is synchronized with the output of each of the other quantizing arrangements 147, 148 and 149 so all 4 output data signal can be stored simultaneously in the bit map memory array 130.

The signal generator 153 is substantially similar to the scaling arrangement 74 described herein as well as the signal generator circuit described in parent application Ser. No. 07/472,668 and will not be described hereinafter in greater detail.

Although the preferred embodiment of the present invention the quantizing unit 146 translates a 4-bit digital signal into a single bit binary signal, it will be understood by those skilled in the art that the converted digital signal may contain fewer than or more than 4-bits to represent a different quantizing arrangement.

Considering now the scaling generator 142 in greater detail with reference to FIGS. 8 and 9, the scaling generator 142 generally comprises a pair of scaling units 162 and 164 for eliminating or substantially reducing patterning associated with repetitive "beats" in the displayed image. The scaling units 161 and 162 include a pair of buffers 163 and 164 and a pair of scaling arrangements 165 and 167.

The scaling generator 142 is substantially identical to the buffer and scaling generator 135 except that it operates at a substantially high rate because it is stepped by a memory video clock signal (CLKA) as opposed to the pixel clock signal (PXCLK). As the generator 142 is otherwise substantially identical to the buffer and scaling generator 135 it will not be described hereinafter in greater detail.

Although in the preferred embodiment of the present invention the high speed display device has been described as a thin film transistor active matrix panel, it will be understood by those skilled in the art that other types of high speed color display devices such as a high speed color television monitor unit could also be driven by the color enhancing interface controller.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A high speed color display unit for interfacing a personal computer to a high speed display device having a plurality of pixel elements for forming a full color image displayed repeatedly over a large number of successive frames, said unit, comprising:
   coupling means for electrically connecting the personal computer to the high speed display device;
   said coupling means including analog to digital conversion means for transforming an analog color video signal into a digital signal having N bits;
   quantizing means coupled to said analog to digital conversion means for compressing said digital signal to M bit without introducing any substantial quantizing errors in a displayed video image over the large number of successive frames;
   said N bit digital signal having a substantially greater number of bits than said M bit digital signal;
   acceleration means for modulating the M bit digital signals to drive a high speed display device and for causing individual ones of the plurality of pixel elements to be activated selectively so that over the large number of successive frames pixel images are produced that closely approximate desired pixel shading levels corresponding to levels defined by said digital signals having n bits and without introducing any substantial extraneous heat patterns or flicker in said displayed video image.

2. A high speed color display unit as recited in claim 1, wherein said coupling means further includes:
   low speed video means for coupling the unit to the personal computer; and
   high speed video cable means for coupling the unit to the high speed display device.

3. A high speed color display unit as recited in claim 2 wherein said low speed video means is partially disposed in said personal computer and partially disposed in the unit.

4. A display control system for use with a high speed display device having a plurality of pixel elements for forming a full color visual image displayed repetitively over a large number of successive frames, in response to input signals being indicative of a desired pixel image shading level for individual ones of said plurality of pixel elements, said system comprising:
   interface means including analog to digital conversion means for digitizing the input signals into digital signals each having N bits of digital information;
   means for generating quantizing averaging signals arranged in recurring groups of quantizing averaging signals;
   quantizing means responsive to said digital signals and to said quantizing signals for comparing them to generate averaged pixel shading level signals to substantially eliminate contouring in the full color visual image over the large number of successive frames;
   bit map memory means for storing said averaged pixel color shading level signals;
   high speed duty cycle means for retrieving the averaged pixel color shading level signal at a sufficient rate to drive the high speed display device and for causing individual ones of the plurality of pixel elements to be activated selectively so that over the large number of successive frames each pixel image produced in the full color visual image closely approximates the desired pixel image shading level without introducing any substantial extraneous beat patterns and flicker in the full color visual image;
   wherein said quantizing means includes:
   buffer means for temporarily storing said digital signal; and
   low speed duty cycle means coupled to said buffer means for quantizing said digital signals without introducing any substantial quantization errors over the large number of successive frames, said digital signals being quantized into averaged pixel color shading level signals each having M bits of digital information, where M is substantially smaller than N.

5. A display system as recited in claim 4, wherein said low speed duty cycle means includes:
   comparing means for generating said averaged signal whenever the value of the temporarily stored digital signal exceeds or equals the value of a corresponding one of said quantizing signals.

6. A method for displaying a full color visual image comprising:

generating pixel clock signals for controlling the displaying of the visual image in successive frames, each one of said frames being defined by a frame time interval, said frame time interval being defined by a frame time predetermined number of said pixel clock signals;

producing groups of digital signals, each digital signal in said groups of digital signals being indicative of a desired colored pixel image having a substantially large finite number of color shading levels, said finite number being defined by a predetermined number of N digital bits in each one of said digital signals;

producing in response to said pixel clock signals a series of quantizing averaging signals arranged in recurring groups of said quantizing averaging signals;

comparing certain ones of said predetermined number of N digital bits in each one of said digital signals and individual corresponding ones of said quantizing averaging signals to develop a quantized pixel color signal whenever the value of the certain ones of said predetermined number of digital bits is at least equal to the value of said corresponding quantizing averaging signal so that said quantized pixel color signals over a large number of successive frames closely approximates the color shading level of said desired pixel image to eliminate substantially contouring in the full color visual image;

each said quantized pixel color signal having M digital bits where M is substantially smaller than N;

temporarily storing said quantized pixel color signals in a frame array adapted for a high speed display device;

retrieving the stored quantized pixel color signals (;

producing a series of color shading level averaging signals arranged in recurring groups of said color shading level averaging signals; and comparing individual ones of the retrieved quantized pixel color signals and individual corresponding ones of said color shading level averaging signals to develop an output signal to cause the high speed display device to produce individual pixel images whenever the value of the quantized pixel color signal is at least equal to the value of said corresponding color shading level averaging signal;

said output signal having P digital bits, where P is substantially less than M, whereby the average intensity level for each pixel image over a large number of successive frames closely approximates a desired colored pixel image shading level without introducing extraneous beat patterns or any substantial flicker in the full color visual image.

* * * * *

UNITED STATES PATENT AND TRADEMARK OFFICE
CERTIFICATE OF CORRECTION

PATENT NO. : 5,225,875

DATED : July 6, 1993

INVENTOR(S) : Leonid Shapiro et al.

It is certified that error appears in the above-identified patent and that said Letters Patent is hereby corrected as shown below:

Column 20, line 8, after "signals", delete " (".

Signed and Sealed this

Nineteenth Day of April, 1994

Attest:

BRUCE LEHMAN

Attesting Officer   Commissioner of Patents and Trademarks